United States Patent [19]
Hikida et al.

[11] 3,904,251
[45] Sept. 9, 1975

[54] AUTOMATIC SKID REDUCTION CONTROL METHOD AND DEVICE FOR A BRAKING SYSTEM

[75] Inventors: Ryotaro Hikida; Yasutaka Hayashi; Hideo Arakawa; Takahiko Mori, all of Nagoya, Japan

[73] Assignee: Kabushiki Kaisha Toyota Chuo Kenkyusho, Aichi, Japan

[22] Filed: May 14, 1973

[21] Appl. No.: 359,623

[30] Foreign Application Priority Data
May 15, 1972 Japan.............................. 47-47849

[52] U.S. Cl........................ 303/21 BE; 188/181 C
[51] Int. Cl......................................... B60T 8/10
[58] Field of Search .......... 188/181 C; 303/20, 21; 317/5; 324/161; 340/52 R, 53, 263, 62; 307/10 R

[56] References Cited
UNITED STATES PATENTS
| | | | |
|---|---|---|---|
| 3,622,208 | 11/1971 | Krugler, Jr...................... | 303/21 BE |
| 3,709,565 | 1/1973 | Jonason et al.................. | 303/21 BE |
| 3,762,775 | 10/1973 | Ochiai........................ | 303/21 BE X |

*Primary Examiner*—Trygve M. Blix
*Assistant Examiner*—Stephen G. Kunin
*Attorney, Agent, or Firm*—Burgess Ryan and Wayne

[57] ABSTRACT

An automatic brake controlling method and device for applying brake pedal forces to a wheel of a moving vehicle, includes acceleration detecting apparatus for detecting the acceleration of a moving vehicle; wheel velocity detecting apparatus for detecting a wheel speed of the moving vehicle; feedback apparatus for computing the vehicle velocity by integrating the detected acceleration, comparing the vehicle velocity and the wheel velocity, feeding back the difference signal between the vehicle velocity and the wheel velocity, and memorizing the difference signal; auxiliary feedback apparatus for feeding back an electrical signal according to the difference signal; computing apparatus for computing whether a slip ratio of said wheel velocity to said vehicle velocity is larger than a predetermined value or not; and controlling apparatus for controlling the brake force to a reduced level whenever said slip ratio is larger than said predetermined value on the application of the brake, thereby compensating the operational error of said integrator apparatus when the brake is gently applied for a long time.

12 Claims, 27 Drawing Figures

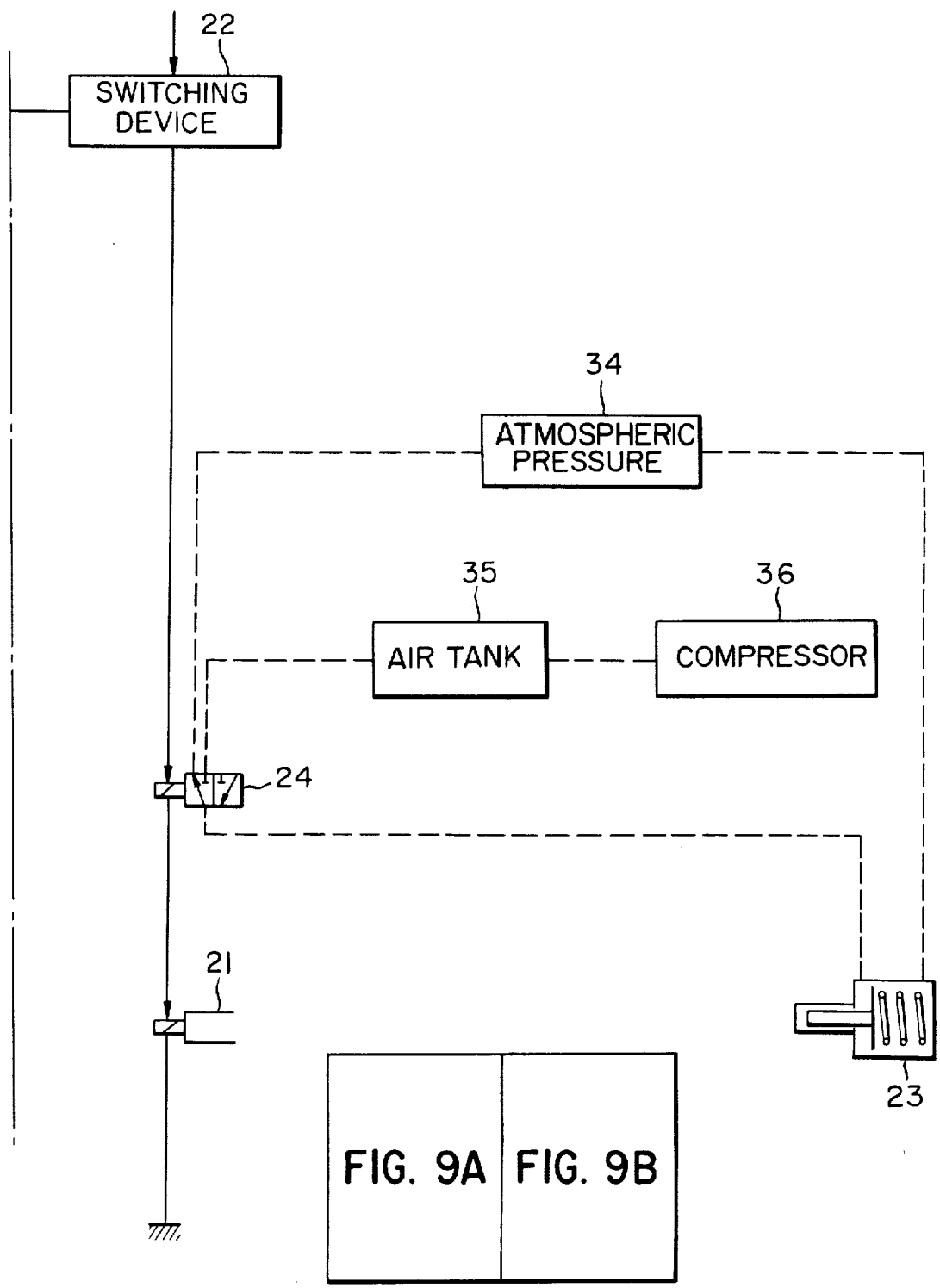

PATENTED SEP 9 1975

SHEET 13

3,904,251

BRAKE PEDAL

APPLYING BRAKE PEDAL $t_0$   $t_1 t_2 t_3 t_4$   $t_5$   $t_6$ $\alpha$ $v_r$ $v_\omega$

SWITCHING DEVICE 127

SWITCHING DEVICE 116

COMPARATOR 132

TRIGGER LEVEL

TIMER 138

TRIGGER LEVEL

AUTOMATIC SKID REDUCTION CONTROL METHOD AND DEVICE FOR A BRAKING SYSTEM

BACKGROUND OF THE INVENTION

The present invention generally relates to a method and device for automatically controlling the braking forces to the be applied to wheels of a vehicle, and more particularly a system and device for automatically controlling the hydraulic pressure in a brake system of a vehicle in response to a velocity thereof and a wheel speed or rotational speed of wheels thereof, thereby effecting the braking action in such a manner that the maximum coefficient of dynamical friction may be maintained between the road and the tires of a vehicle.

The relation between the slip ratio $\beta$, which is given by $$\beta = \frac{\text{velocity of vehicle} - \text{wheel speed}}{\text{velocity of vehicle}}$$

and the coefficient of dynamic friction $\mu$ varies depending upon the road surface conditions, such as dry or wet road surfaces, pavements such as concrete or asphalt pavements, frozen or snow-covered road surfaces and so on. In general, the larger a skidding and slip ratio, the less the cornering force or stability of the vehicle becomes.

It is therefore, preferable that when the brake is applied, the wheel speed is controlled in the proximity of such a slip ratio that the coefficient of friction between the road and wheels or tires becomes maximum and the cornering force also becomes maximum. In case of a dry road surface, such optimum slip ratio is about 0.2, but in case of a wet road surface, the higher the slip ratio $\beta$ becomes, the higher the coefficient of friction $\mu$. The coefficient of friction $\mu$ becomes maximum when the slip ratio $\beta$ is 1.0, and the coefficient of friction $\mu$ gradually increases in the slip or skidding ratio of from 0.15 – 0.25 to 1.0 but the coefficient of friction $\mu$ when the slip ratio is about 0.15 – 0.25 is not so greatly different from that when the slip ratio $\beta$ is 1.0. As a result, even when the wheel speed is so controlled on the wet road as to obtain a slip ratio $\beta = 0.2$, which equals the slip ratio in case of a dry road, the stopping distance is not increased as compared with that in case of a dry road.

It therefore follows that when the wheel speed is controlled with a slip ratio $\beta = 0.15 - 0.25$ or $\beta = 0.10 - 0.03$, the stopping distance may be reduced while the stability of the vehicle is improved as compared with the conventional brake system incorporating no automatic brake control system.

In the conventional acceleration detection method for controlling the braking action, an inertia spool is displaced against a spring in response to the magnitude (absolute value) of an acceleration (which is normally negative or deceleration when brake is applied), thereby varying the cross sectional area of a port in a hydraulic pressure pipe communicating a master cylinder with a wheel cylinder. Therefore, when the acceleration is small after applying the brake pedal, the cross sectional area of a port remains small so that even when the hydraulic pressure of the master cylinder is high, a relatively low hydraulic pressure is transmitted to the wheel cylinder for a while. As a result, slipping is reduced so as to maintain the stability of the vehicle. Furthermore, this system is unsatisfactory in that the wheel speed cannot be controlled so as to attain a slip ratio $\beta = 0.15$–$0.25$ because this is dependent upon the road surface conditions; the erratic operation tends to occur very often due to the effect caused by the component of the gravitational acceleration when the vehicle is travelling on an inclined road; and oscillations also tend to occur.

In the conventional brake control method of the type detecting the reaction from the road surface, the reaction force produced when the braking force is applied to the wheel or tire is mechanically or hydraulically detected. In response to the detected reaction force, the cross sectional area of a port in a pipe line communicating a master cylinder with a wheel cylinder is controlled. This system is unsatisfactory in that it is very complicated to construct and the oscillations tend to occur very often.

In the method for detecting wheel speed, the rotational speed of a wheel or propeller shaft is detected and differentiated to obtain an acceleration of a wheel. When a detected acceleration is in excess of a predetermined level, the hydraulic pressure in a wheel cylinder is reduced, thereby preventing slipping. In general the $\beta$-$\mu$ characteristic is a function, in a strict sense, of a velocity of a moving vehicle. (In general when the velocity of a moving vehicle is small, the coefficient of friction $\mu$ becomes large.) It follows therefore that the large reaction force detected does not mean that a slip ratio approaches $\beta = 0.15 - 0.25$. Since the wheel speed detecting system controls the wheel cylinder pressure only in response to the rotational speed of a wheel or propeller shaft, its function is adversely affected by noise or the like.

A common defect of the above three control methods is that since the braking action is controlled only in response to the acceleration of a moving vehicle or wheel, a slip ratio $\beta$ is not maintained at an optimized value.

Slip ratio detecting methods, which are the most reliable brake control methods, have been proposed. One of them is of a wheel acceleration detecting system in which the rotational speed $\omega$ of a wheel or propeller shaft (which rotates at a speed in proportion to that of a wheel) is detected and differentiated with respect to time, and when the derivative - $d\omega/dt$ is in excess of a predetermined level so that wheels skid or slip the hydraulic pressure in wheel cylinders is reudced. However, this method is unsatisfactory in that since the operation of differentiation is adversely affected by noise, the slip ratio $\beta$ cannot be computed with a required degree of accuracy so that the timing for returning the wheel cylinder pressure to a normal level cannot be determined correctly. An improvement of this method for overcoming the above defect will result in a very complex and expensive method.

In the case of a dry road surface, where the coefficient of friction $\mu$ becomes maximum between $0 < \beta < 1$, the derivative - $d\omega/dt$ becomes large when the coefficient of friction $\mu$ decreases from its maximum point, and the timing when the wheel cylinder pressure is decreased may be easily determined. But in case of a wet road surface, the coefficient of friction $\mu$ becomes maximum when the slip ratio is 1.0 or a value very close thereto, whereas the derivative - $d\omega/dt$ will not become so large. Therefore, the wheel cylinder pressure cannot be decreased when the slip ratio is optimum. Furthermore, since the coefficient of friction $\mu$ becomes maximum when the slip ratio $\beta$ is 1.0, it is preferable to apply the brake with $\beta = 1.0$ in order to reduce the stopping distance, but the maneuvability or steerability becomes worse as the slip ratio $\beta$ becomes greater. In view of the above it is preferable to select the slip ratio $\beta$ to satisfy the following conditions $0.15 < \beta < 0.25$ or
$0.10 < \beta < 0.30$ However, the control of braking action with the above slip ratio $\beta$ is not necessarily ensured by the wheel acceleration detecting method. Therefore in case of a wet road surface, error in the timing of the control of braking action tends to occur.

In another conventional slip ratio detecting method, the hydraulic pressure in a wheel cylinder is controlled in response to a slip ratio which in turn is obtained in terms of a difference between a velocity of a moving vehicle, which is obtained by the integration of an acceleration thereof, and a wheel speed thereof. In principle, this method is a most preferable brake control method, but it has not been satisfactory in practice because of the error of a velocity of a moving vehicle produced in the operation of integration by the accumulated noise and drift or the like.

SUMMARY OF THE INVENTION

One of the objects of the present invention is therefore to provide a method and device in which noise and drift or the like introduced in the computed method of a velocity of a moving vehicle is eliminated or compensated by the difference between the velocity of the moving vehicle, which in turn is computed from an acceleration thereof, and a wheel speed thereof, thereby effecting the braking action of wheels with an optimum slip ratio.

According to one embodiment of the present invention, a difference signal representing the difference between a velocity of a moving vehicle, which in turn is computed by an integrator integrating an acceleration thereof, and a wheel speed thereof is applied to the integrator and a memory or storage device through a switching device, thereby eliminating the computation error.

When the brake pedal is applied so that the switching device is opened, the error caused in the process of integration by the integrator due to the variation in noise stored when the brake pedal is gently applied, is eliminated by the difference signal stored in the memory device and a low frequency signal component, that is, the noise filtered out of the difference signal detected and computed when the brake pedal is applied, thereby effecting the correct braking action.

According to another embodiment of the present invention, when the brake pedal is applied so that the switching device is opened, the error caused in the process of integration by the integrator due to the variation in noise stored when the brake pedal is gently applied, is eliminated by the difference signal stored in the memory device and by a low-level signal which is obtained by passing through a coefficient multiplier the difference signal detected and computed when the brake pedal is applied.

According to another embodiment of the present invention, when the difference signal becomes in excess of a predetermined level, the output of the coefficient multiplier is interrupted so that the noise may be more satisfactorily eliminated.

According to another embodiment of the present invention, when the brake pedal is gently applied so that no slip occurs, the switching device is not opened but when the brake pedal is applied hard so that an actuator or a brake booster is activated, the switching device is opened after a predetermined time following actuation of the actuator, thereby compensating or eliminating the error introduced in the operation of integration by the integrator due to the variation in noise when the brake pedal is applied.

According to another embodiment of the present invention, the switching device is intermittently opened and closed until the difference signal reaches a predetermined level after the brake pedal has been applied. When the difference signal reaches a predetermined level, and after the braking, force is exerted in excess of a predetermined time interval, the switching device is intermittently opened and closed, thereby minimizing the computation error. When the brake pedal is applied hard, the timing for the the switching device to open is so adjusted that the correct braking action control may be attained.

The above and other objects, features and advantages of the present invention will become more apparent from the following description of preferred embodiments thereof taken in conjunction with the accompanying drawings.

BRIEF DESCRIPTION OF THE DRAWING:

FIGS. 9A–12B are block diagrams of further embodiments of the present invention;

FIGS. 14–1 to 14–8 are graphs used for the explanation of the mode of operation of the twelfth embodiment;

Figure 1:
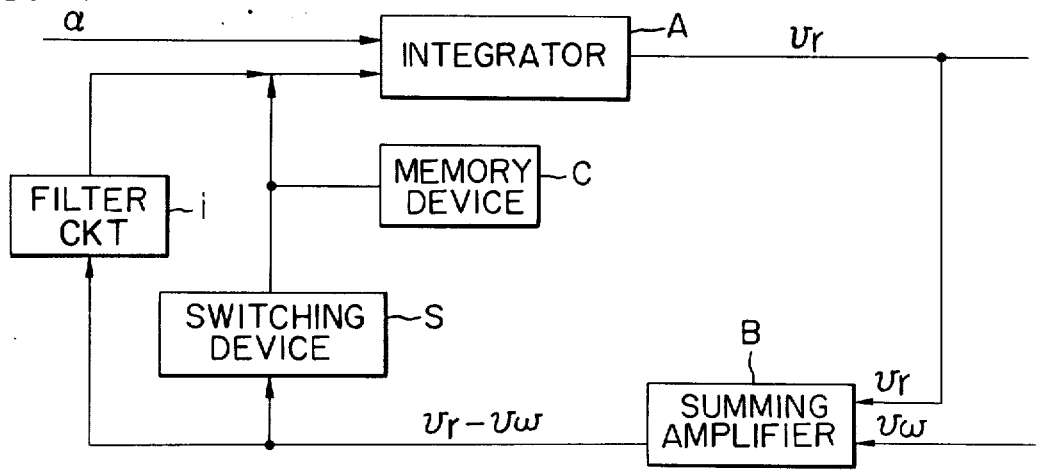
FIGS. 1 – 5 are block diagrams of fundamental embodiments of the present invention.

DESCRIPTION OF THE PREFERRED EMBODIMENTS:

First Embodiment, FIG. 1

Referring to FIG. 1, a vehicle velocity V$\gamma$, which is computed from an acceleration of the vehicle detected by an accelerometer (not shown) by an integrator means A comprising an amplifier and an integrator (an operational amplifier), and a wheel speed V$\omega$ are applied to summing amplifier B comprising a differential amplifier and an amplifier, and the output of the summing amplifier B representing the difference signal between the vehicle velocity V$\gamma$ and the wheel speed V$\omega$ is transferred into a memory means C through a first switching means S and means for auxiliarily feeding back a signal of a low frequency component of said electrical signal indicating the difference between the vehicle velocity and the wheel velocity to said integrator means A, such as a filter circuit i connected in parallel therewith. The output of the summing amplifier B is also fed back to the integrator means A so that the vehicle velocity $V\delta$ may coincide with the wheel speed $V\omega$ when a brake pedal (not shown) is not applied. However, when the brake pedal is applied, a feedback system is disconnected by the switching means S from the memory means C and the integrator means A so that the noise introduced in the computation process of a vehicle velocity $V\gamma$ may be compensated by the signal stored in the memory means C and the slip ratio may be computed from the difference signal between the vehicle velocity $V\gamma$ and the wheel speed $V\omega$. If the slip ratio is larger than a predetermined ratio, the braking force is reduced, whereas when the slip ratio is smaller, the braking force is increased. Since the noise in the output of the accelerometer may be compensated by the signal stored in the memory means C and by the output signal of the filter circuit, the brake system may be controlled with a higher degree of accuracy. The low frequency component, that is the noise of the difference signal, is auxiliarily fed back through the filter circuit i to the integrator means A so that the error in the output signal of the integrator means A due to the variation in noise accumulated when the brake pedal is gently applied may be compensated.

In this embodiment, the output of the filter circuit i is shown as being directly connected to the input of the integrator means A, but it is to be understood that the filter circuit i may comprise a capacitor in the memory device C.

Figure 2:
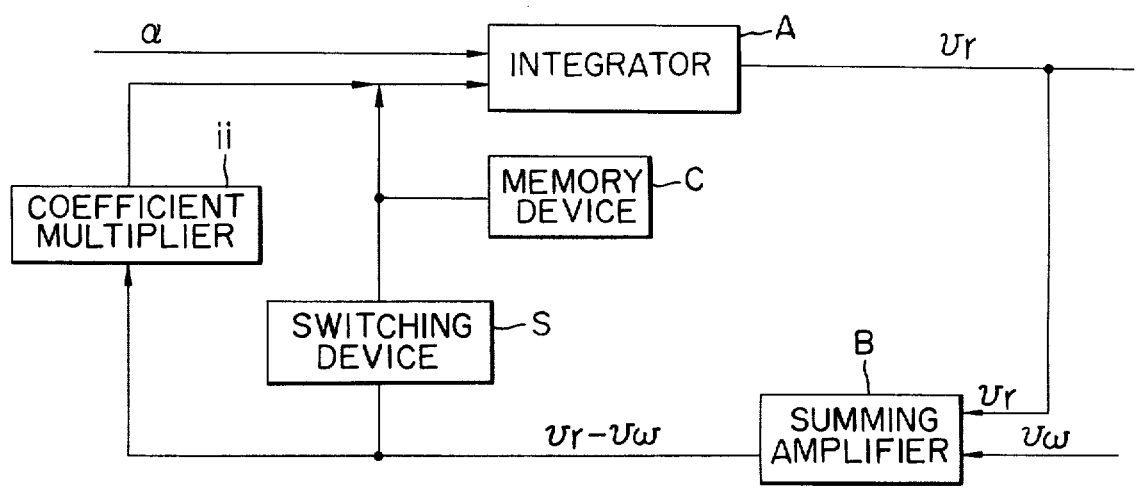

Second Embodiment, FIG. 2

The second embodiment shown in FIG. 2 is substantially similar to the first embodiment shown in FIG. 1 except that instead of the filter circuit i, a coefficient multiplier ii is inserted in order to apply the auxiliary feedback signal of a low level to the integrator means A, thereby controlling the brake system with a higher degree of accuracy.

Figure 3:
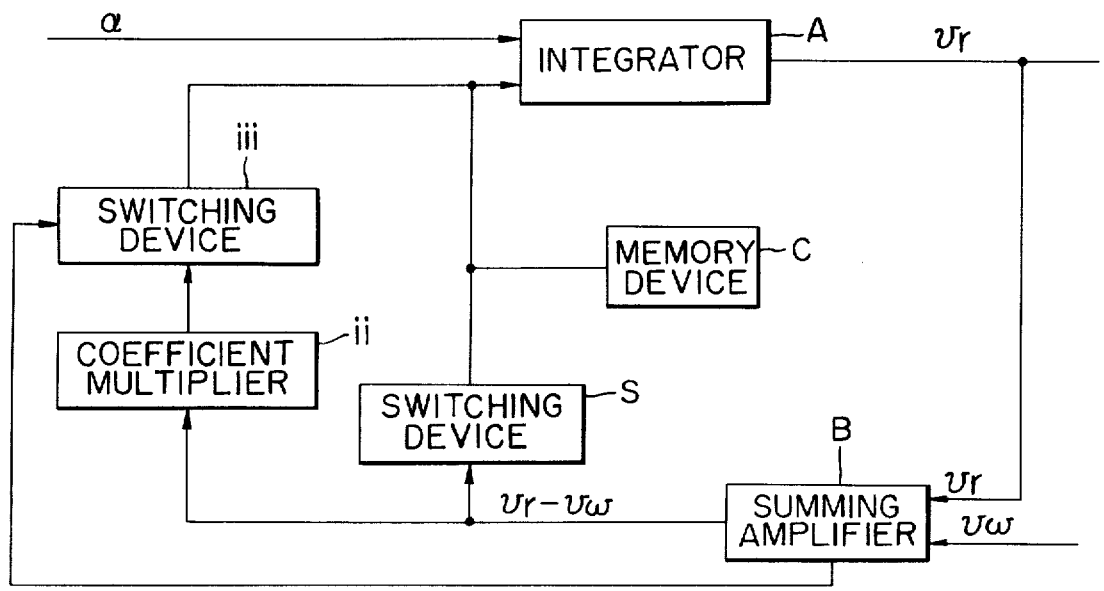

Third Embodiment, FIG. 3

The third embodiment shown in FIG. 3 is substantially similar to the second embodiment shown in FIG. 2 except that another switching device iii is inserted between the coefficient multiplier ii and the integrator means A so that not only the low-level feedback signal may be auxiliarily fed back to the integrator means A when the brake pedal is applied but also when the slip is increased, that is the difference between the vehicle speed $V\gamma$ and the wheel speed $V\omega$ becomes greater, the switching device iii may be opened, thereby interrupting the auxiliary feedback signal. Therefore, the third embodiment may compensate the noise in more satisfactory manner than the second embodiment.

Figure 4:
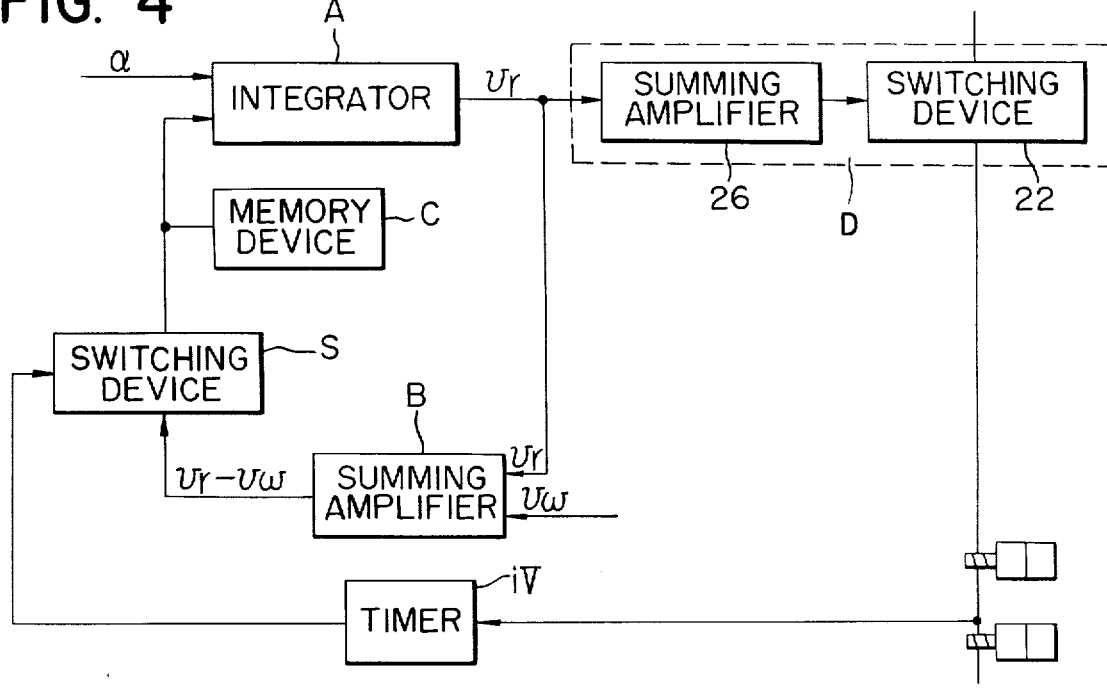

Fourth Embodiment, FIG. 4

The fourth embodiment shown in FIG. 4 is substantially similar to the first embodiment shown in FIG. 1 except that the amplification degree of the summing amplifier B is selected to be smaller than that of the first embodiment, a timer iv is inserted between the switching circuit S and a control circuit (computing means) D for computing whether a slip ratio of said wheel velocity to said vehicle velocity is larger than a predetermined value or not and for controlling an actuator or a brake booster in the brake system and the filter circuit i is not connected. Even when the brake pedal is applied to produce the slow braking force, the auxiliary feedback signal is applied to the memory means C and the integrator means A so that the noise may be compensated. When the brake pedal is applied hard to actuate the actuator or a brake booster, the switching device S is actuated a predetermined time after the control circuit D is actuated by the timer iv. The switching means S is controlled so as to compensate the error of the output of the integrator means A due to the variation in noise when the brake is applied. Therefore the difference signal representing the difference between the vehicle velocity and the wheel speed when the brake is applied, is applied to the integrator means A and to the memory circuit C so that the noise error caused when the brake is applied softly may be eliminated.

Figure 5:
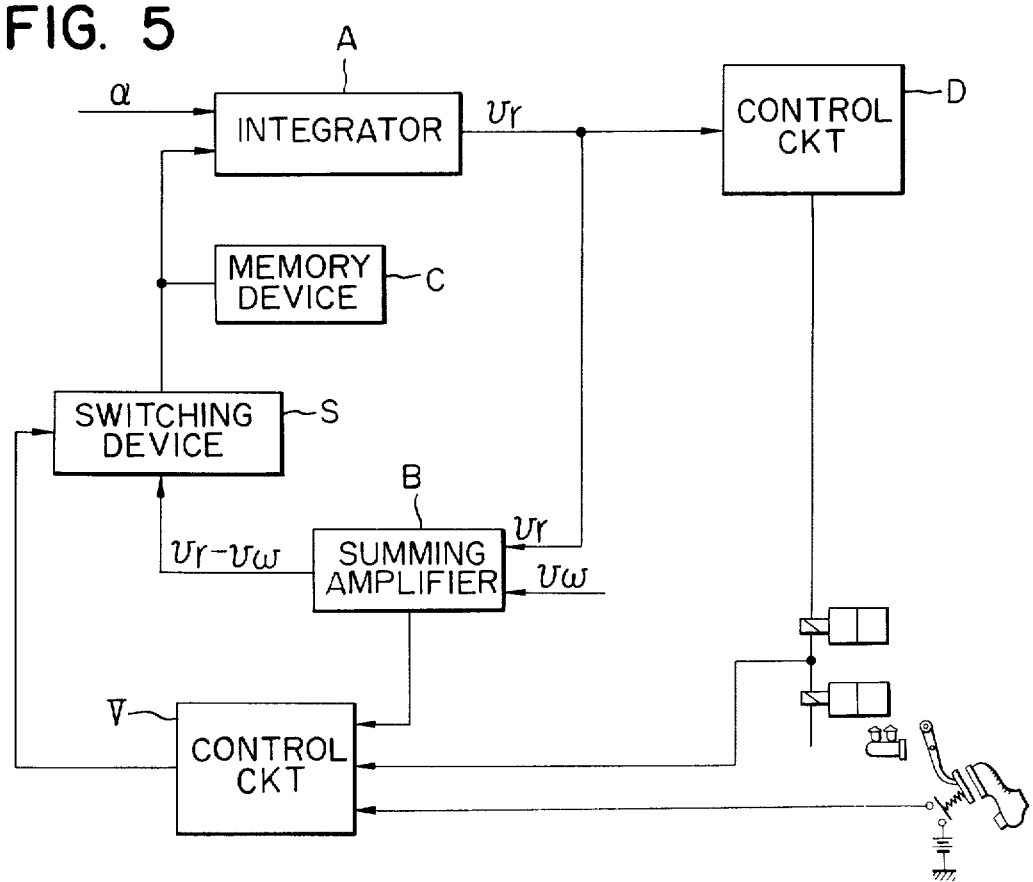

Fifth Embodiment, FIG. 5

The fifth embodiment shown in FIG. 5 is substantially similar to the first embodiment shown in FIG. 1 except that a control circuit v is inserted between the control circuit D, the summing amplifier B and a brake pedal E on the one hand and the first switching means S on the other hand and the filter circuit i is not connected. Therefore, the first switching means S is intermittently actuated from the time when the brake pedal E is applied until the difference signal representing the difference between the signal representing the vehicle speed and the signal representing the speed of the wheels reaches a predetermined level, and after the control circuit D is actuated for a predetermined time, the first switching means S is also intermittently controlled or actuated. In the fifth embodiment, the switching circuit S is intermittently actuated when the brake pedal E is applied and difference signal is fed back in such a way that the error of the output signal of the integrator means due to the noise may be minimized. Furthermore, timing when the first switching means S is opened is so controlled as to effect the braking action with an extremely higher degree of accuracy.

Figure 6A:
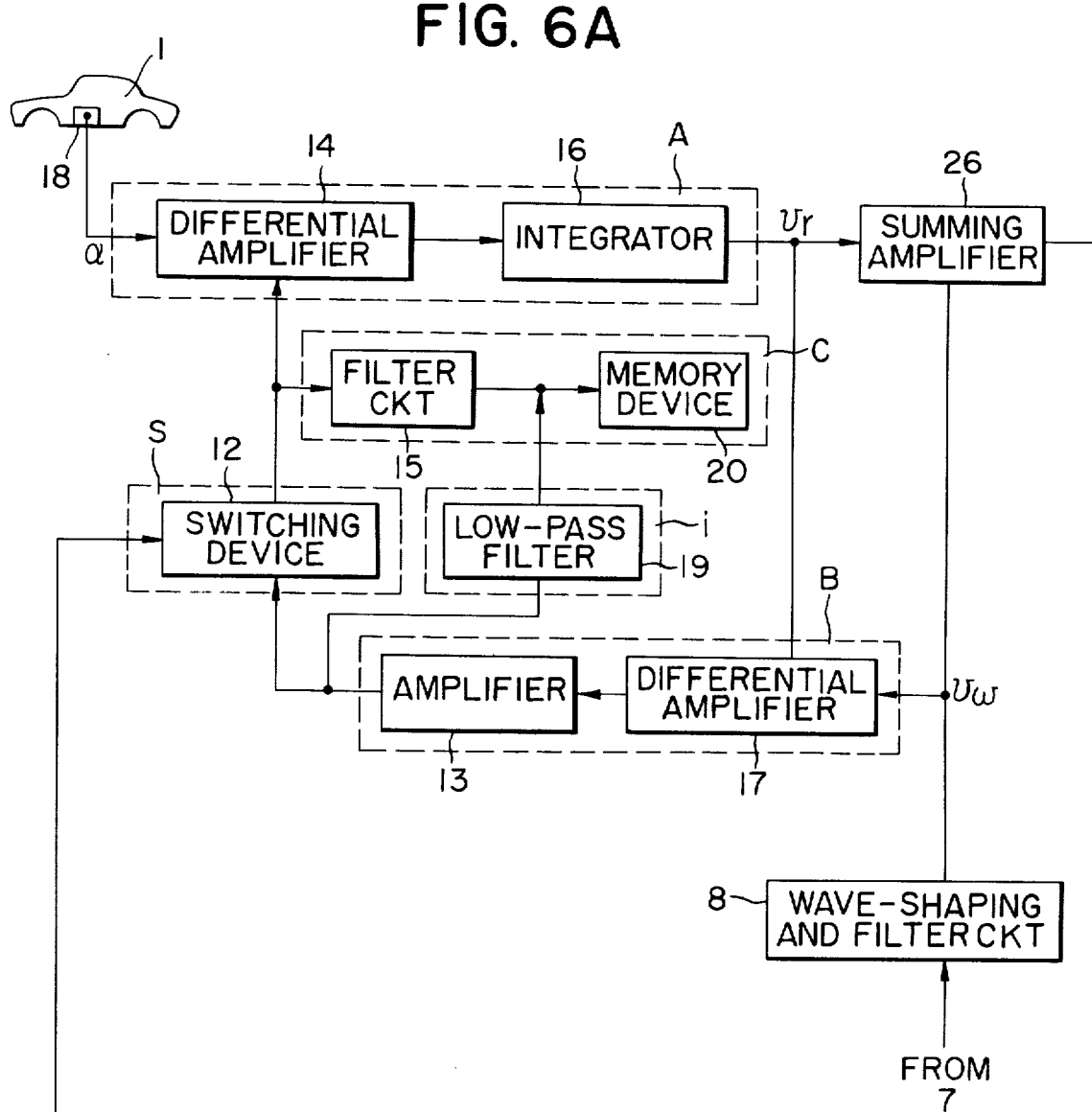
FIGS. 6A–6B are block diagrams of a sixth embodiment of the present invention applied to an automotive vehicle.
Figure 6B:
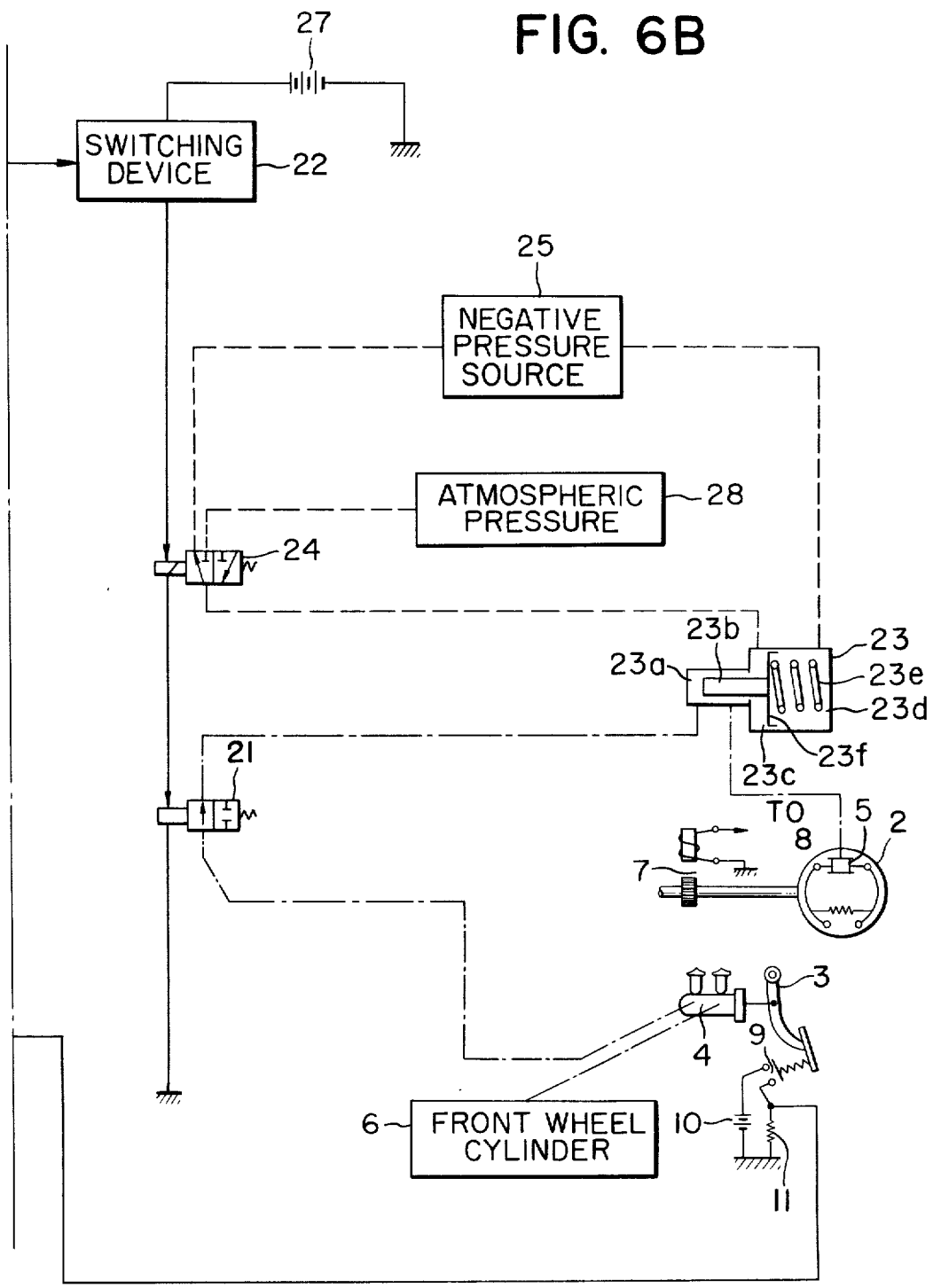

Sixth Embodiment, FIGS. 6A–6B

Figures 1, 14:
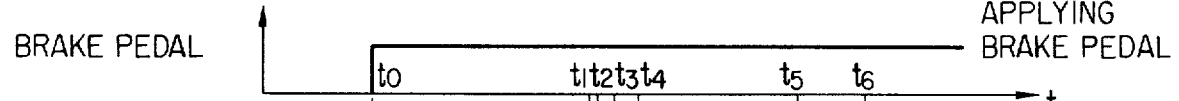
Figures 2, 14:
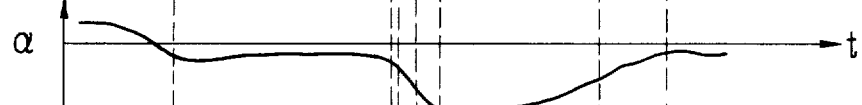
Figures 3, 14:
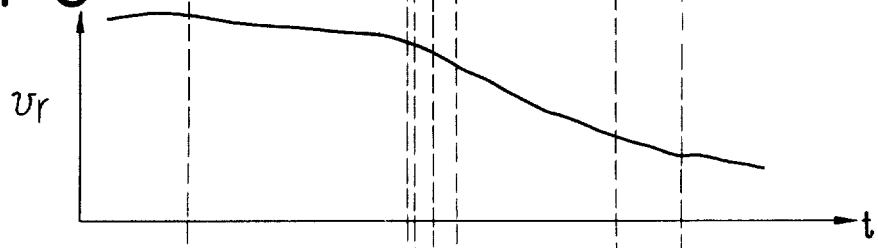
Figures 4, 14:
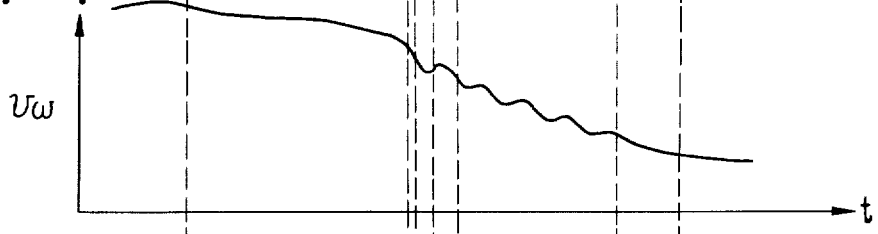
Figures 5, 14:
Figures 6, 14:
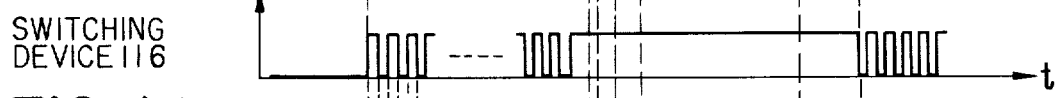
Figures 7, 14:
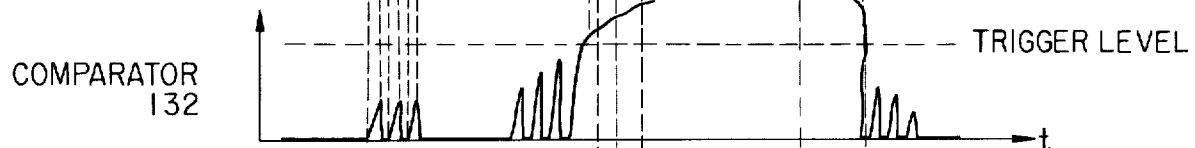
Figures 8, 14:
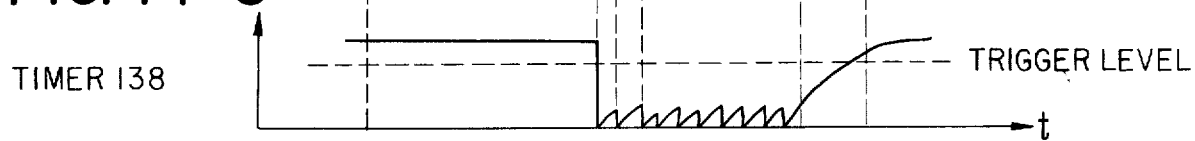

The sixth embodiment shown in FIG. 6 is an example of an automatic control system in accordance with the present invention applied to an automotive vehicle. Reference numeral 1 designates an automotive body; 2, a rear wheel; 3, a brake pedal; 4, a master cylinder; 5, a rear wheel cylinder; and 6, a front wheel cylinder. In the instant embodiment, the automatic control system will be described in connection with the control of the hydraulic pressure in the rear wheel cylinder 5, but the hydraulic pressure in the front wheel cylinder is controlled by the conventional brake system not incorporating the automatic brake control system in accordance with the present invention. The output of a tachometer 7, which detects the rotational speed of a propeller shaft which in turn represents or is in proportion to the wheel speed is transmitted to a filter and wave-shaping circuit 8.

When the brake pedal 3 is not applied when the automotive vehicle is travelling, a switch 9 is opened so that no current flows from a D - C power source 10 to a resistor 11. Under this condition, the first switching device S or 12 is closed so that the output signal of the amplifier 13 is transmitted to the differential amplifier 14 and filter circuit 15. The difference between the vehicle velocity $V\gamma$ which is the output of the integrator 16 and the wheel speed $V\omega$ which is the output of the wave-shaping and filter circuit 8 is computed by the differential amplifier 17 and amplified by the amplifier 13 so that the output signal $K(V\gamma - V\omega)$ is transmitted to the differential amplifier 14. Therefore, the difference signal in proportion to the difference between the feedback signal $K(V\gamma - V\omega)$ and the output signal $\alpha$ of an accelerometer 18 is applied to the integrator 16. Thus, it is seen that the differential amplifier 14, the integrator 16, the differential amplifier 17, the amplifier 13 and the switching device 12 make up a closed control loop. An amplification degree K of the feedback signal $K(V\gamma - V\omega)$ of the amplifier 13 is selected to be sufficiently large so that the output $V\gamma$ substantially equals $V\omega$. When the output $\alpha$ of the accelerometer 18 includes, in addition to the true acceleration $\alpha_o$ of the automotive vehicle the noise $n$ such as drift or a component of the weight of the automotive vehicle in the direction parallel with the road surface of the up-or downgrade hill, the noise signal is also fed back through the switching device 12 to the differential amplifier 14. As a result, the noise signal $n$ is subtracted from the acceleration signal $\alpha = \alpha_o + n$ so that only the net acceleration signal $\alpha_o$ may be applied to the integrator 16. At the same time, the output signal $n$ of the amplifier 13 is delivered through a filter 15 and another low-pass filter 19, respectively, to be stored in the memory device 20 as the signal $n_m$. The filter 15 is inserted between the switching device 12 and the memory device 20, and another low-pass filter 19 is inserted between the amplifier 13 and the memory device 20. The cut-off frequency of the low-pass filter 19 is lower than that of the low-pass filter 15.

Next, it will be described that feedback signal is noise signal $n$. When the feedback signal is given in the form of p, $$V\gamma = \int (\alpha_o + n - p) \, dt \quad (1)$$

When the brake pedal is not applied there is no slippage between the wheels and the ground so that the derivative of the wheel speed $V\omega$ must equal the true vehicle speed. That is $$\dot{V}\omega = \alpha_o \quad (2)$$

Rearranging Eq. (1) by substituting Eq. (2) into Eq. (1), we obtain $$V\gamma - V\omega = \int (n - p) \, dt \quad (3)$$

The difference signal is amplified by the amplifier 13 so that the feedback signal is given by $$p = k \int (n - p) \, dt \quad (4)$$

Differentiating Eq. (4), we obtain $$\dot{p} + k(p - n) = 0 \quad (5)$$

Eq. (5) shows that the feedback signal p follows the variation in noise signal $n$. Since $k$ is sufficiently large, the feedback signal p follows (or is in proportion to) the noise signal $n$. That is $p \doteq n$ (6)

From Eqs. (6), (3) and (4), we have $$V\gamma = V\omega - n/k \quad (7)$$

Since $k$ is very large, $V\omega \gg n/k$ and $$V\gamma \doteq V\omega \quad (8)$$

Next, the mode of operation when the brake is applied will be described. When the driver applies the brake pedal 3, the switch 9 is closed so that current flows from the power source 10 to the resister 11. As a result, the switching device 12 is opened so that the output of the amplifier 13 is prevented from being applied to the differential amplifier 14 and to the filter 15. Therefore, the signal $n_m$ stored in the memory device 20 is transferred to the differential amplifier 14, thereby compensating the noise signal $n$.

Further, when the brake pedal 3 is gently applied for a long time, the noise signal from the amplifier 13 is different from the noise signal before the brake pedal is applied, i.e., the noise signal $n_m$ stored in the memory device 20, due to the change in slope of the road or drift of the accelerometer, another electrical element, and so on. So the noise signal $n_m$ stored in the memory device 20 may be compensated by the signal transmitted through the low-pass filter 19. That is, the low-pass filter 19 is provided in order to compensate the variation in the noise signal n caused when the brake pedal is applied for a relatively long time in such a manner that no slip will occur. Therefore, it is preferable that a time constant of the low-pass filter is relatively large.

When the brake pedal 3 is applied, the hydraulic pressure in the master cylinder 4 is transmitted to a two-way valve 21. When the slip ratio is small, a second switching device 22 is not actuated as will be described in more detail hereinafter and the two-way valve 21 is opened so that the hydraulic pressure in the master cylinder 4 is transmitted to the rear wheel cylinder 5 through a hydraulic cylinder 23a of an actuator 23. Therefore, when the slip ratio is small, the braking force is applied to the rear wheel. When the switching device 22 is not actuated, a three-way valve 24 is so actuated as to communicate between a negative pressure source 25 and a left pneumatic cylinder chamber 23c of the actuator 23. Since the negative pressure source 25 is normally communicated with a right pneumatic cylinder chamber 23d, a diaphragm 23f made integral with a hydraulic piston 23b is biased to the left under the force of a spring 23e.

A summing amplifier 26 is inserted in order to compute $$K_\beta \{(1 - \beta c)V\gamma - V\omega\}$$

where $\beta c$ = present slip ratio, and $K_\beta$ = amplification degree $\gg 1$. When the term $(1 - \beta c)V\gamma - V\omega$ is positive, the slip ratio $\beta$ is larger than the desired or predetermined slip ratio $\beta c$. When the brake pedal 3 is applied hard so that the slip is so increased that the output signal $K_\beta (1 - \beta c)V\gamma - V\omega$ of the summing amplifier 26 becomes positive, the switching device 22 is closed, so that the current from a D - C power source 27 generates the controlling means, in more detail the current flows to the solenoid coils of the three-way valve 24 and the two-way valve 21. As a result, the two-way valve 21 interrupts the transmission of the hydraulic pressure from the master cylinder 4 to the hydraulic cylinder 23a of the actuator 23 whereas the left chamber 23c is communicated with the atmospheric pressure 28 through the three-way valve 24 so that the diaphragm 23f connecting with the hydraulic piston 23b is caused to move to right against the spring 23e. The volume of the hydraulic liquid in the hydraulic cylinder 23a is increased, but the communication between the hydraulic cylindex 23a and the master cylinder 4 is interrupted by the two-way valve 21 so that the hydraulic pressure in the hydraulic cylinder 23a and in the rear wheel cylinder 5 is reduced. As a consequence, the slip ratio of the rear wheel is reduced and when $K_\beta$ $(1-\beta c)V\gamma - V\omega$ becomes negative from positive, the switching device 22 is opened again so that the normal braking action may be effected. The above operation is cycled when the brake is applied.

The time required for decreasing the hydraulic pressure in the rear wheel cylinder or for returning to the normal braking operation is of the order of a few seconds and ten seconds at the most so that the computation of the vehicle velocity $V\gamma$ will not be adversely affected at all because the time constant of the low-pass filter 15 is relatively large even though the signal $K(V\gamma - V\omega)$ is fed back to the differential amplifier 14 through the low-pass filter 15. When the brake is abruptly applied hard, the signal $K(V\gamma - V\omega)$ would become large, but because of the saturation characteristic of the amplifier 13, the excessive signal is cut off. That is, the signal in excess of the saturation value will not be transmitted to the filter 15 so that the computation of the vehicle velocity $V\gamma$ will not be adversely affected at all. Even when the vehicle velocity $V\gamma$ is somewhat influenced, it is always smaller than the true vehicle velocity so that the hydraulic pressure in the wheel cylinder 5 is controlled in response to a slip ratio in excess of a predetermined slip ratio $\beta c$. Therefore, the braking system may be actuated safely.

Figure 7:
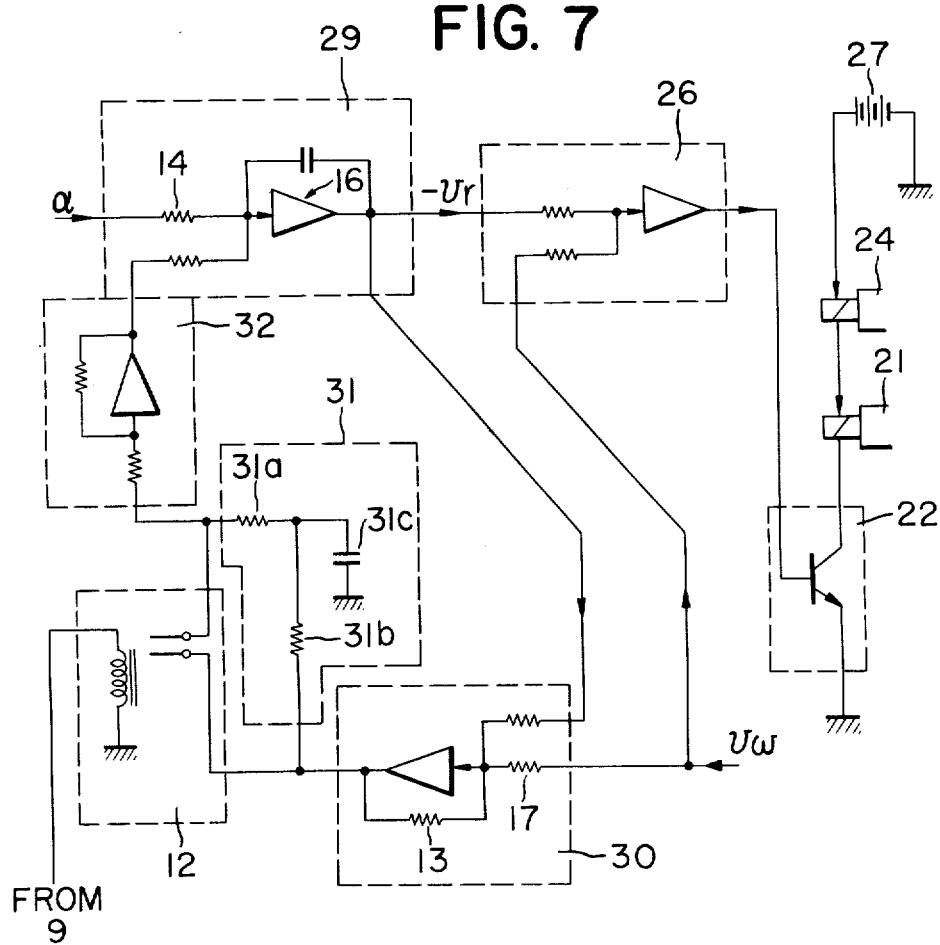
FIG. 7 is a diagram of an electronic circuit of the eighth embodiment shown in FIGS. 6A–6B.

The electronic component parts of the sixth embodiment are shown in FIG. 7. Reference numeral 29 designates an integrator means a comprising the differential amplifier 14 and the integrator 16;30, an adder-amplifier comprising the differential amplifier 17 and the amplifier 13;31, a block including the filters 15 and 19 and the memory device 20;31a and 31b, resistors; 31c, a capacitor; and 32, a signal converter.

Figure 8:
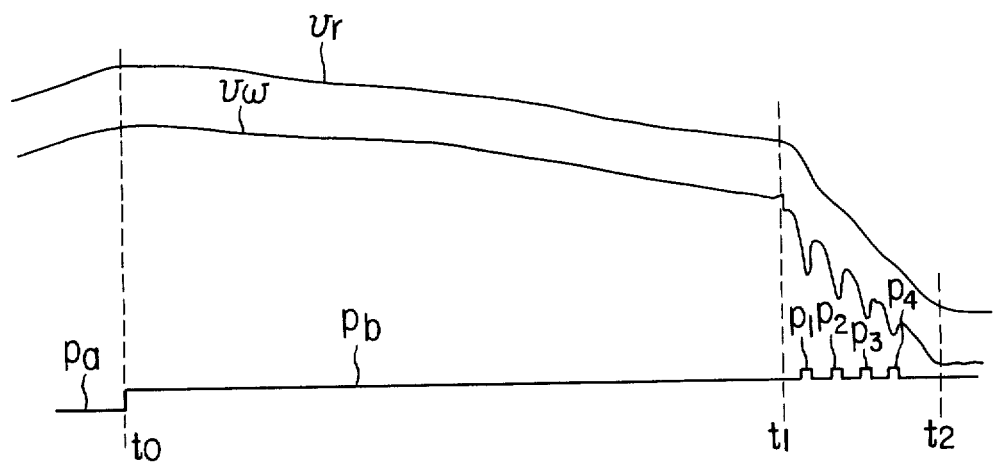
FIG. 8 is a graph used for the explanation of the mode of operation of the sixth embodiment.

FIG. 8 is a graph illustrating the mode of operation of the sixth embodiment. Time is plotted along the abscissa whereas the vehicle velocity $V\gamma$ and the wheel speed $V\omega$, along the ordinate. Until time $t_o$, the brake pedal is not applied as indicated by the straight line $P_a$, and when the brake pedal is applied at time $t_o$, the signal $p_b$ is stored in the memory device 20 and the switching device 12 is opened. From time $t_o$ to $t_1$ the brake pedal is applied gently so that no slipping occurs. That is, the brake system is so controlled that $$V\gamma \doteq V\omega$$

From time $t_1$ to $t_2$, the brake pedal is applied hard so that the rear wheel 2 slips and the brake system is controlled in the manner described hereinbefore. That is, the signals $p_1, p_2, p_3$ and $p_4$ represent that the switching device 22 is closed. At time $t_2$, both the automotive body 1 and the wheels 2 are stopped almost simutaneously.

Figure 9A:
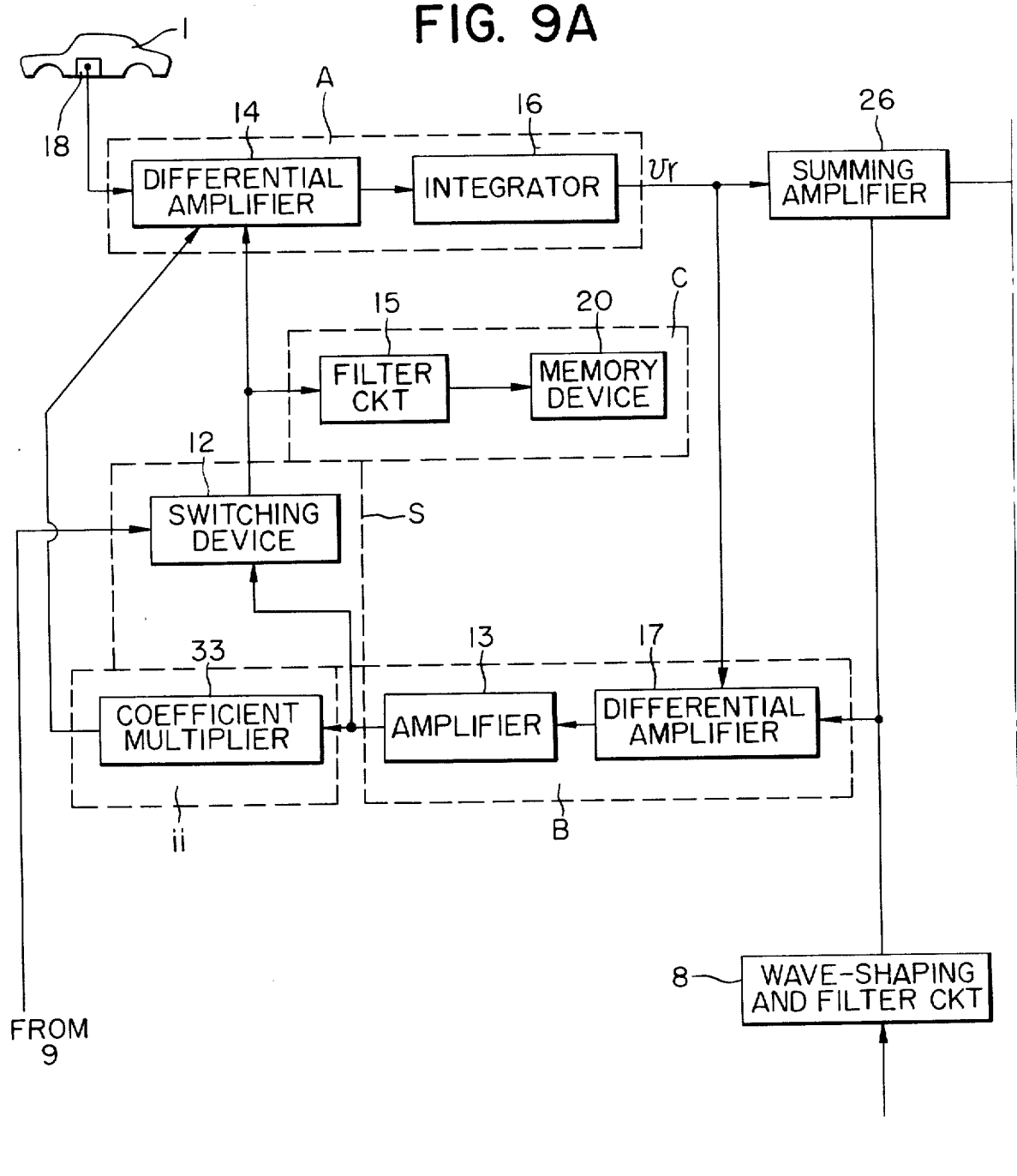

Seventh Embodiment, FIGS. 9A-9B

The seventh embodiment shown in FIG. 9 is substantially similar to the sixth embodiment except that the low-pass filter 19 is eliminated whereas a coefficient multiplier 33 is inserted between the amplifier 13 and the differential amplifier 14 in order to make the feedback signal of the level and instead of the negative pressure source 25 and the low atmospheric pressure 28 in FIG. 6B, the atmospheric pressure source 34, and the air tank 35 and the compressor 36 are used, respectively, because of the use of the positive pressure for an air pressure source. Therefore, the variation in noise and the like are kept transmitted to the differential amplifier 14 even when the brake pedal 3 is applied so that the switching device 12 is opened. As a result, the variation in noise and the like produced after the brake pedal was applied may be immediately compensated.

Figure 10:
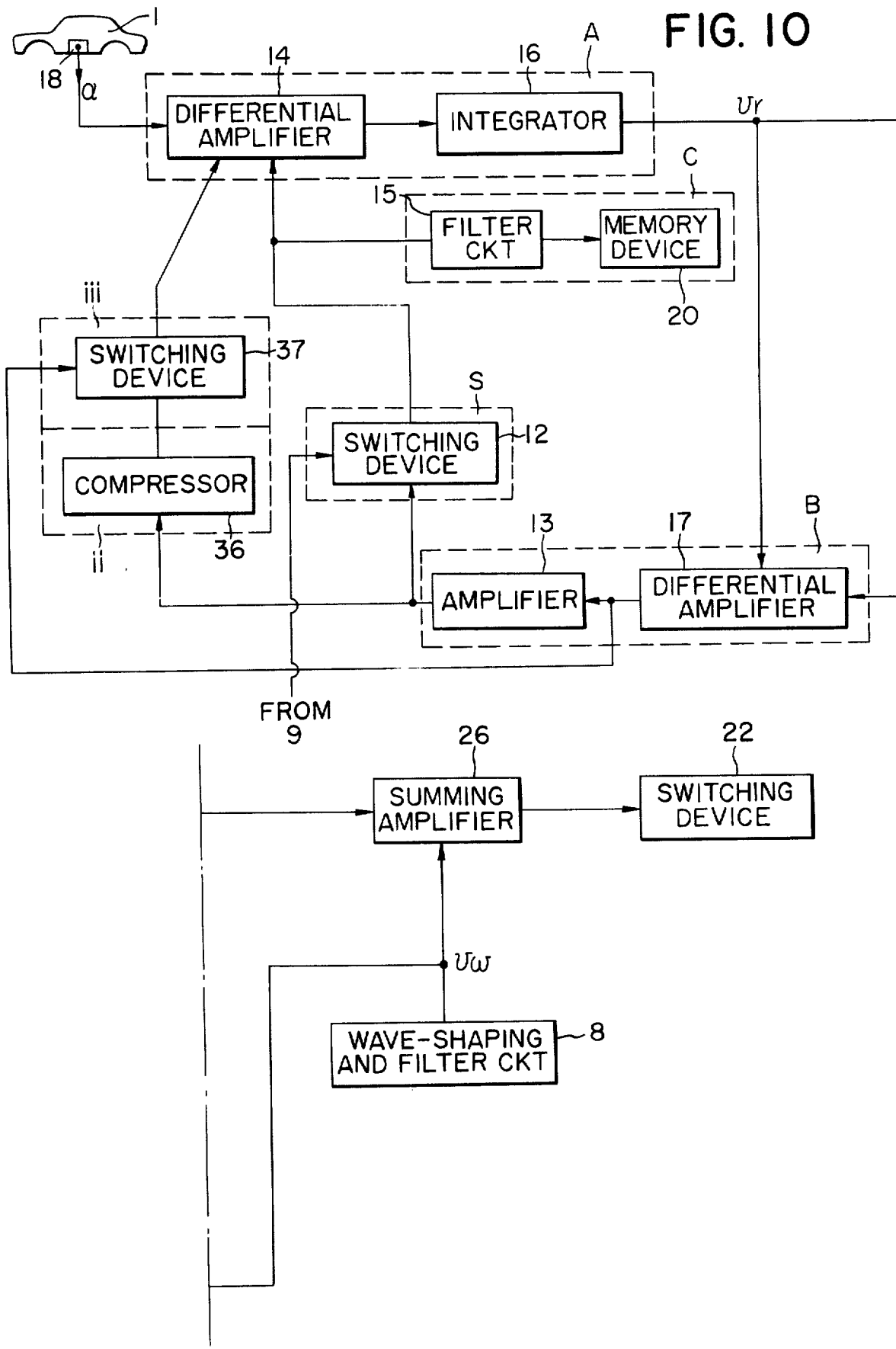

Eighth Embodiment, FIG. 10

The eighth embodiment shown in FIG. 10 is substantially similar to the seventh embodiment shown in FIGS. 9A-9B in the electrical circuit except that a switching device 37 is inserted between the coefficient multiplier 33 and the differential amplifier 14. The switching device 37 is closed when the output signal $(V\gamma - V\omega)$ of the differential amplifier 17 is less than a predetermined level so that the output signal of the coefficient multiplier 33 may be fed back to the differential amplifier 14. However when the signal $(V\gamma - V\omega)$ becomes in excess of the predetermined level, the switching device 37 is opened so that the output signal of the coefficient multiplier 33 to be applied to the differential amplifier 14 may be interrupted. That is, until the brake pedal 3 is applied, both the switching devices 12 and 37 are closed, and the gain of the closed loop including the differential amplifier 14, the integrator 16, the differential amplifier 17 the amplifier 13 and the switching circuit 12 is high so that the closed system may attain the condition of $$V\gamma \doteq V\omega$$

regardless of the variation in both acceleration signal $\alpha$ and wheel speed signal $V\omega$. When the brake pedal 3 is not applied so hard as the rear wheel 2 slips, the switching device 12 is closed whereas the switching device 37 remains opened so that the closed loop with a relatively small gain including the differential amplifier 14, the integrator 16, the differential amplifier 17, the amplifier 13, the coefficient multiplier 33 and the switching device 37 may attain the condition of $$V\gamma \doteq V\omega$$

as long as the wheel speed does not change abruptly.

When the brake pedal 3 is applied so hard that the rear wheel 2 slips, the change of the wheel speed $V\omega$ with respect to time becomes large so that the vehicle velocity $V\gamma$ cannot be controlled so as to follow the wheel speed $V\omega$ by means of the closed loop consisting of the differential amplifier 14, the integrator 16, the differential amplifier 17, the amplifier 13, the coefficient multiplier 33 and the switching device 37. As a result, $(V\gamma - V\omega)$ becomes in excess of a predetermined level so that the switching device 37 is opened and the output signal of the coefficient multiplier 33 is not fed back to the differential amplifier 14. Therefore, the integrator 16 integrates the difference between the acceleration signal $\alpha$ and the compensation signal $n_m$ stored in the memory device 20, whereby the vehicle velocity $V\gamma$ may be obtained.

When the anti-skidding control is effected by intermittently increasing and decreasing the hydraulic pressure in the rear wheel cylinder 5, the vehicle velocity $V\gamma$ and the wheel speed $V\omega$ may be maintained to satisfy the following relation:

$$(1-\beta c)\ V\gamma \doteq V\omega \qquad (9)$$

As a result, the output signal of the differential amplifier 17 is positive and in excess of the predetermined level, and the switching device 37 remains opened. When the brake pedal 3 is released so that the slip is reduced and the wheel speed Vω approaches the vehicle velocity Vγ, the output of the differential amplifier 17 becomes less than the predetermined level so that the switching device 37 is closed again. In regard to the ON-OFF controlling method for the switching device 37, in addition to the above method, it may be effected by means of a timer in such a manner that when the switching device 22 has been switched from ON to OFF, or OFF to ON and the next inversion (OFF to ON, or ON to OFF) thereof does not occur within a predetermined time, the switching device 37 is closed (ON) or opened (OFF) in response to the output signal from the timer.

Figure 11:
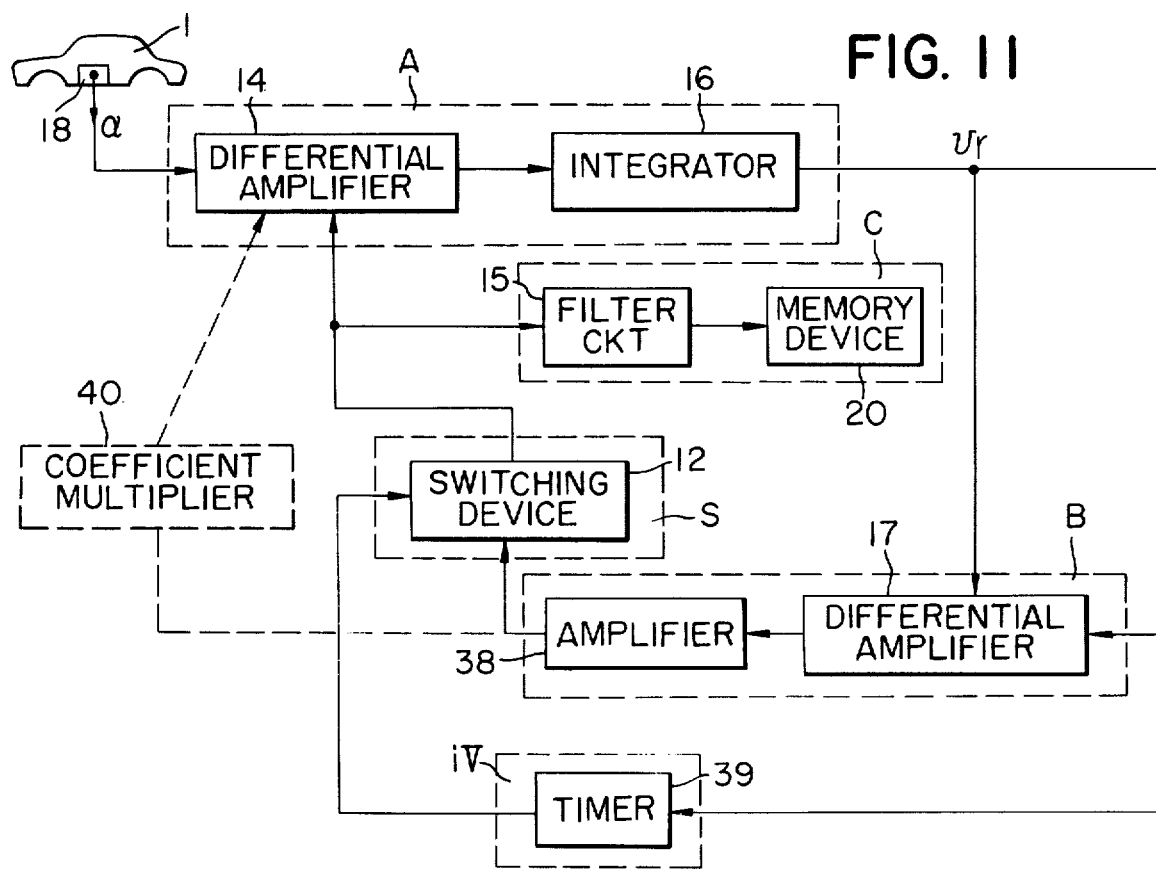
Figure 11:
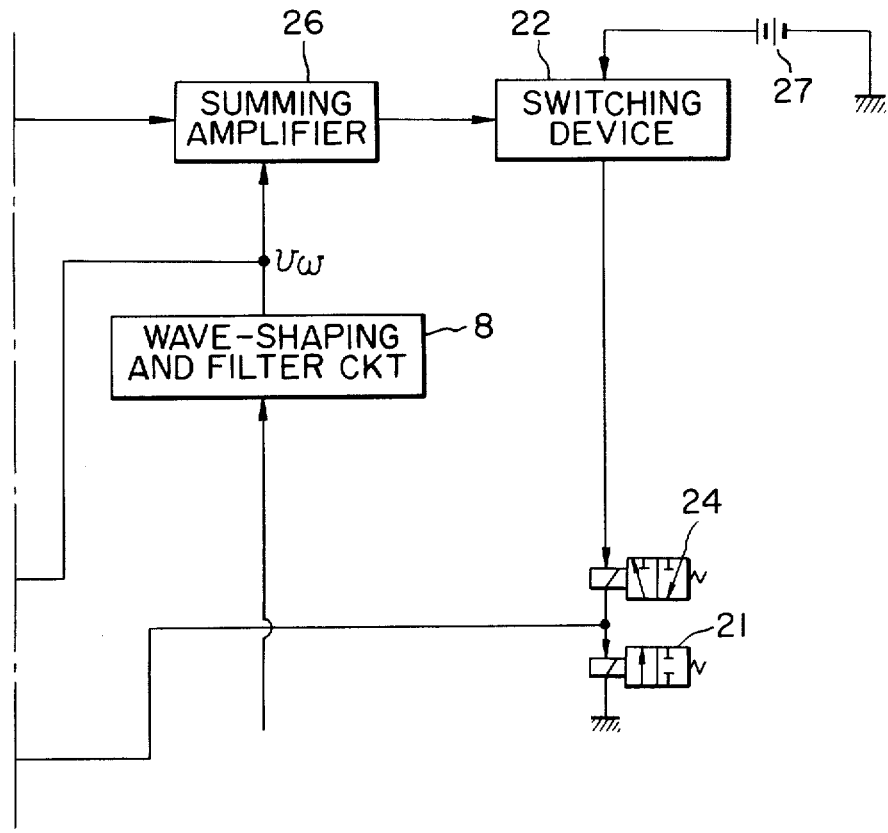

Ninth Embodiment, FIG. 11

The ninth embodiment shown in FIG. 11 is similar to the sixth embodiment shown in FIGS. 6A–6B in the electrical circuits except that the low-pass filter 19 is eliminated, an amplifier 38 with a gain smaller than that of the amplifier 13 is inserted instead of the amplifier 13, and that a timer 39 is inserted between the first switching device 12 and the output of the second switching device 22 so that the first switching device 12 is not actuated in response to the application of the brake pedal 3 but is actuated in response to the output of the timer 39 which in turn is actuated when the switching device 22 is closed. Since the amplification degree of the amplifier 38 is smaller than that of the amplifier 13 in the sixth embodiment, the closed loop consisting of the differential amplifier 14, the integrator 16, the differential amplifier 17, the amplifier 38 and the switching device 12 cannot control the vehicle velocity Vγ so as to follow the wheel speed Vω when the change of the wheel speed Vω with respect to the time is large. However, when the wheels slip, the following relation is established:

$$(1 - \beta c) V\gamma - V\omega > 0 \qquad (10)$$

and the switching device 22 is closed so that the timer 39 is set. As a result the switching device 12 is opened for a predetermined time (for example 0.5 to 5.0 seconds) so that the signal of the amplifier 38 may be prevented from being fed back to the differential amplifier 14. It should be noted that when the switching device 22 is opened and then closed again while the timer 39 is actuated, the timer 39 is set again.

When the brake pedal is applied so hard that the rear wheels slip, the switching device 12 is opened and the vehicle velocity Vγ is computed independently of the wheel speed Vω. When the brake pedal is applied gently so that no slip occurs, the switching device 12 is closed so that the following condition may be attained: Vγ ÷ Vω.

In the instant embodiment, in order to assure the safe operation of the automatic control system, the output of the amplifier 38 is multiplied by a small coefficient by means of the coefficient multiplier 40 and then fed back to the differential amplifier 14. Therefore, the vehicle velocity Vγ is computed relatively smaller than the true vehicle velocity so that the automatic control system is actuated at a slip ratio relatively larger than the predetermined slip ratio βc. Alternatively, the output of the amplifier 38 may be transferred into the memory device 20 through a filter circuit.

Tenth Embodiment, FIGS. 12A–12B, 13 and 14-1 TO 14-8

Figure 12A:
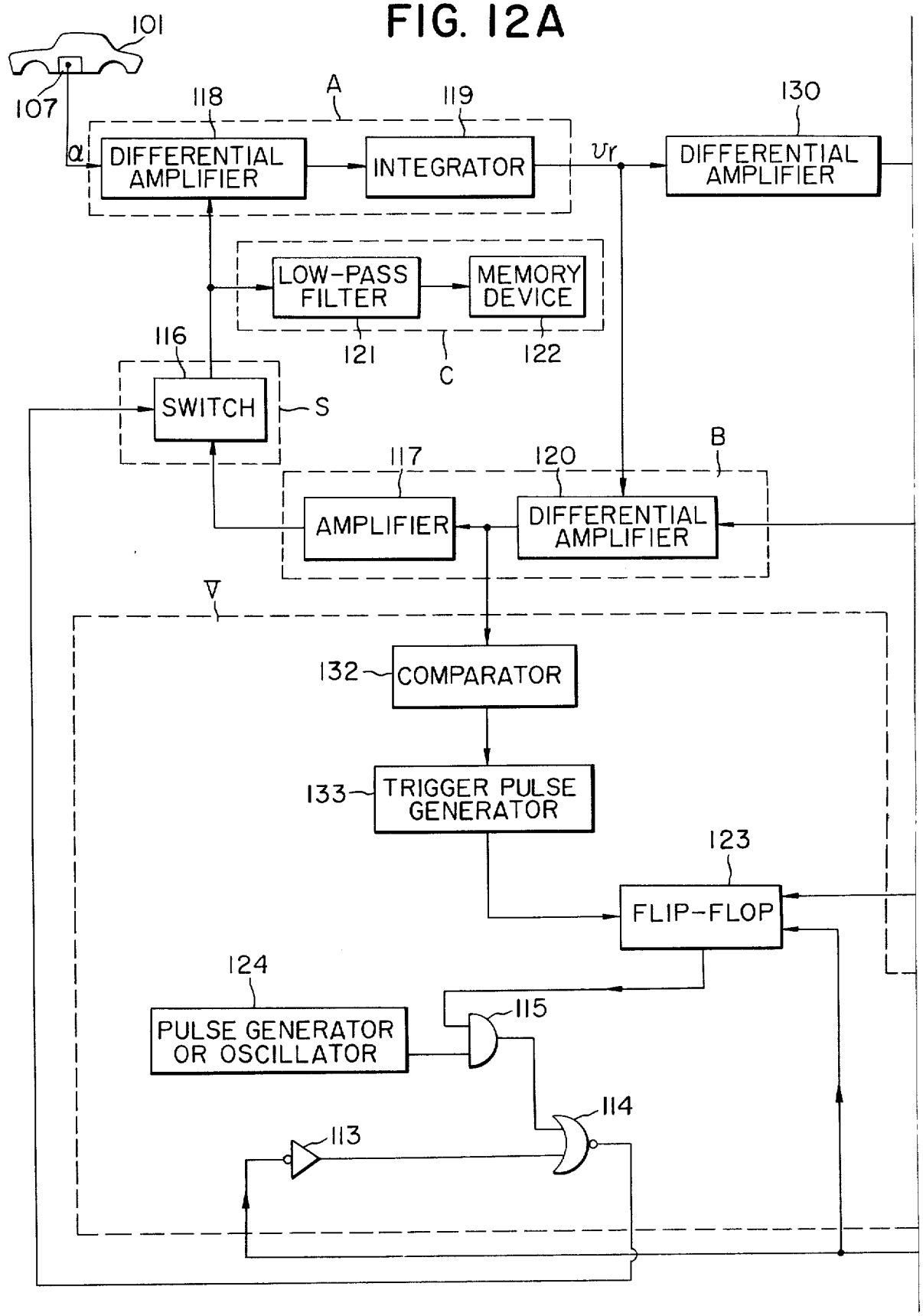
Figure 12B:
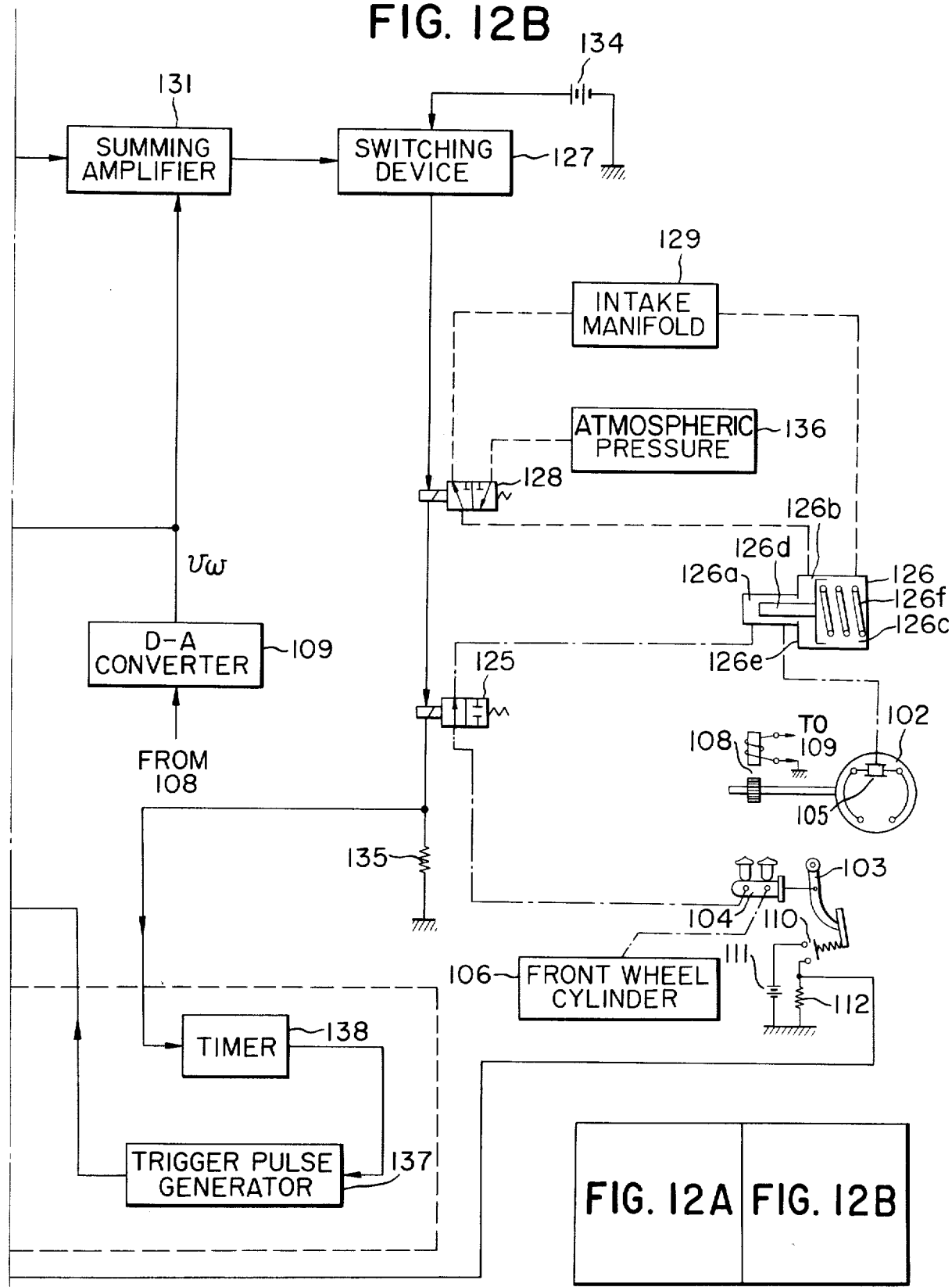

Referring to FIGS. 12A–12B, reference numeral 101 designates an automotive body; 102, a rear wheel; 103, a brake pedal; 104, a master cylinder; 105, a rear wheel cylinder; and 106, a front wheel cylinder. In the instant embodiment only the braking action on the rear wheels is controlled by the automatic brake control system according to the present invention whereas the front wheels are braked in the normal manner when the brake pedal 103 is applied.

The acceleration α of the automotive body 101 is detected by an accelerometer 107 mounted upon the body 101, and the wheel signal Vω is obtained by detecting the rotational speed of the propeller shaft by means of a tachometer 108 and converting the rotational speed thereof into the analog signal by a DA converter 109.

When a brake pedal 103 is not applied while the automotive vehicle is travelling, the switch 110 is opened so that no current flows into a resistor 112 from a power source 111. Therefore, the zero voltage is applied to the input of a NOT circuit 113 so that the output signal 1 is derived therefrom and applied to a NOR circuit 114. As a result the output signal of the NOR circuit 114 is 0 irrespective of the output signal applied thereto from an AND circuit 115. When the output signal of from the NOR circuit 114 is 0, the switch 116 is closed so that the output signal of an amplifier 117 is transmitted to a differential amplifier 118 and a memory device 122. Thus, the differential amplifier 118, an integrator 119, a differential amplifier 120, an amplifier 117 and the switching device 116 make up the closed loop so that the output Vγ of the integrator 119 may be so controlled as to satisfy the following relation of $$V\gamma = V\omega$$

in a manner substantially similar to that described with reference to FIGS. 6A–6B because the amplification degree K of the amplifier 117 is sufficiently large. When the output α of the accelerometer 107 includes the noise n in addition to a true acceleration $\alpha_o$, the signal representing the noise is fed back through the switching device 116 to the differential amplifier 118, but only the true acceleration signal $\alpha_o$, the noise signal being subtracted from the output signal ($\alpha_o + n$) of the accelerometer 107, is transmitted to the integrator 119 in a manner substantially similar to that described hereinbefore with reference to FIGS. 6A–6B.

The feedback signal n is also transferred through a low-pass filter 121 into a memory device 122 where it is stored as a signal $n_m$. Since the signal n is always changing, the signal $n_m$ stored in the memory device 122 changes in proportion to the signal n as long as the switching device 166 is closed.

Next the braking action when the brake pedal 103 is applied will be described. The driver either applies the brake pedal 3 very hard and abruptly in case of an emergency, applies the brake pedal so gently as to gradually decrease the vehicle speed, or applies the brake pedal in such a manner that no braking action is caused. But it should be noted that when the driver applies the brake pedal 103, the switch 110 is closed whether the brake pedal 103 is applied hard or is gently applied so that the output signal of the NOT circuit 113 changes from 1 to 0. Simultaneously, the trigger signal is applied to a flip-flop 123 so that the output thereof becomes 1. A pulse generator or oscillator 124 is adapted to alternately give the signal 0 for $T_1$ second and the signal 1 for $T_2$ second. Therefore, when both of the outputs of the flip-flop 123 and the oscillator 124 are 1, the output signal of the AND circuit 115 becomes 1 whereas the output signal of the NOR circuit 114 becomes 0. As a result, the switch 116 is closed. When the output of the oscillator 124 is 0 and the output of the flip-flop 123 is 1 or when the output of the flip-flop 123 is 0 regardless of the output of the oscillator 124, the output of the AND circuit 115 is always 0 whereas the output of the NOT circuit 113 is 0. As a result, the output of the NOR circuit 114 becomes 1 so that the switching device 116 is opened.

The hydraulic pressure in the master cylinder 104 is transmitted to the rear wheel cylinder 105 through a twoway valve 125 and a hydraulic cylinder 126a of an actuator 126. The two-way valve 125 reamins in the position shown in FIG. 12 unless a switching circuit 127 is closed when the rear wheel slips as will be described in more detail hereinafter. In like manner, a three-way valve 128 remains in the position shown in FIG. 12 unless the switching device 127 is not closed so that the negative pressure in an intake manifold 129 is applied to a left chamber of a pneumatic cylinder 126b. A right chamber 126c is normally in communication with the intake manifold 129. That is, as far as the switching device 127 is opened, both the right and left chambers 126b and 126c are applied with the negative pressure so that a diaphragm 126e integral with a hydraulic piston 126d is biased to left under the force of a spring 126f. The force of the spring 126f is selected to be large so that the diaphragm 126e may not be displaced even when the hydraulic pressure in the cylinder 126a is increased slightly.

Next, and the mode of operation when the brake is so applied that the rear wheels will not slip will be described. When the brake pedal is gently applied, the wheels hardly slip. So the output of the summing amplifier 131 becomes negative and the switching device 127 is not closed. The summing amplifier 131 computes and amplifies the difference signal between the output signal $(1-\beta c)$ of the differential amplifier 130 and the wheel velocity $\beta c$ is the predetermined slip ratio and is normally so selected as to be $0.1 \leq \beta c \leq 0.3$. Similarly, the output signal $(V\gamma - V\omega)$ of the differential amplifier 120 is small. The difference signal $V\gamma - V\omega$ for $T_1$ second during which time the switch 116 is opened is computed by means of a comparator 132. This difference signal $V\gamma - V\omega$ is smaller than the predetermined level, so that the trigger signal of 0 is applied from the trigger pulse generator 133 to the flip-flop 123. As a result the output of the flip-flop 123 is maintained to be 1, and the switch 116 repeats the close and open positions corresponding to the cycle of the pulse generator or oscillator 124, of which the periodic time is $(T_1+T_2)$ seconds. When the switch 116 changes from opened to closed, the differential amplifier 120, the amplifier 117 and the switch 116 make up the closed loop, so that the vehicle velocity $V\gamma$ may be so controlled as to satisfy the relation of $V\gamma \div V\omega$ as the above description when the brake pedal is not applied. The amplification degree of the amplifier 117 is selected to be sufficiently so large that the correction of the vehicle velocity $V\gamma$ may be effected within a very small time $T_2$. Time intervals $T_1$ and $T_2$ are preferably small, but when they are too small the correction thereof is affected by the noise and the like included in the wheel speed signal $V\omega$ is pronounced or the saturation of the amplifier 117 occurs so that they are preferably of the order of $0.01 - 0.1$ seconds in view of the saturation of the amplifier 117. As soon as the vehicle velocity $V\gamma$ is corrected, so is the signal $n_m$ stored in the memory device 122. But it should be noted that the correction of the signal $n_m$ is not required to be accomplished within a time interval $T_2$, but may be accomplished within a repetitive cycle of $(T_1 + T_2)$ because the change of the signal $m_n$ is not so abrupt.

Next the mode of operation will be described when the brake pedal is applied so hard that the rear wheels slip. The output signal $(V\gamma - V\omega)$ within a time interval $T_1$ obtained by a comparator 132 becomes in excess of the predetermined level $\delta$, and the trigger pulse is generated by a trigger pulse generator 133 and applied to the flip-flop 123 so that the output of the flip-flop 123 becomes 0. As a result, the output of the NOR circuit 114 becomes 1 so that the switching circuit 116 is opened. Therefore the switch 116 remains opened regardless of the pulse from the oscillator 124 until the output of the flip-flop 123 becomes 1 or the brake pedal 103 is released, so that the vehicle velocity $V\gamma$ and the wheel speed $V\omega$ are independent from each other. As described hereinbefore the input $\alpha_0$ of the integrator 119 obtained by subtracting the noise signal $n_m$ stored in the memory device 122 from the output of the accelerometer 107 is integrated by the integrator 119 to give the vehicle velocity $V\gamma$. When the wheel speed $V\omega$ is abruptly decreased due to slipping thereof and the output of the summing amplifier 131 changes from negative to positive, the switching device 127 is closed so that the current flows from a power source 134 to the solenoid coils of the three-way valve 128 and the two-way valve 125 and a resistor 135. As a result, the hydraulic cylinder 126a of the actuator 126 is disconnected from the master cylinder 104 whereas the left chamber 126b of the pneumatic cylinder in the actuator 126 is communicated with the surrounding atmosphere 136 through the three-way valve 128. As a result, the diaphragm 126e integral with the hydraulic piston 126d is caused to move to the right so that the volume in the hydraulic cylinder 126a is increased and the hydraulic pressure in the rear wheel cylinder 105 is decreased in proportion thereof. Therefore, the rear wheels are relieved from skidding.

When the rear wheel speed is increased so that the output of the summing amplifier 131 becomes negative again, the switching device 127 is opened so that the three-way valve 128 is actuated. The negative pressure from the intake manifold 129 is applied to the left cylinder chamber 126b so that the diaphragm 126e integral with the hydraulic piston 126d is caused to move to the left. The two-way valve 125 is also actuated so that the hydraulic cylinder 126a is communicated with the master cylinder 104 again, resulting in the increase in hydraulic pressure in the rear wheel cylinder 105 to apply the brake again. When the hydraulic pressure in the rear wheel cylinder 105 is so high that the rear wheels start to skid again, the switching device 127 is closed again. The above operations are cycled so as to control the braking action. However, the output of the flip-flop 123 remains 0 so that the switch 116 also remains opened. That is, when the rear wheels are alternately skidding and being relieved from skidding as the brake pedal 103 is applied hard, the wheel speed $V\omega$ does not represent the true vehicle velocity $V\gamma$ so that the switch 116 is opened and the vehicle velocity $V\gamma$ is derived from integrating the signal obtained by subtracting the noise signal $n_m$ from the output $\alpha$ of the accelerometer 107. The output of the flip-flop 123 is also reversed from 0 to 1 in response to the signal from the trigger pulse generator 137 in addition to the reapplication of the brake pedal 103. The trigger pulse generator 137 gives the trigger pulse when the switching device 127 remains closed or opened over a predetermined time which in turn is determined by a timer 138 after the switching device 127 has been switched OFF to ON or ON to OFF. That is, that the switching device 127 remains opened over the predetermined time interval means that no greater slip or skidding is occuring even when the brake is applied to the rear wheels. In this case, the wheel speed $V\omega$ is regarded as being substantially equal to the vehicle velocity $V\gamma$, and the output of the flip-flop 123 is reversed to 1 so that the switch 116 is closed during the time interval $T_2$ of the cycle the periodic time $(T_1 + T_2)$ seconds. Thus the vehicle velocity $V\gamma$ is so controlled as to be substantially equal to the wheel speed $V\omega$. If the switching device 127 should remain closed over the predetermined time interval, there occurs a contradiction that the rear wheels are not relieved from skidding even when the hydraulic pressure in the rear wheel cylinder 105 is decreased. This leads to an erratic operation of the automatic control system. This erratic operation is caused by the fact that the vehicle velocity $V\gamma$ is in excess of a true vehicle velocity so that the vehicle velocity $V\gamma$ is corrected to satisfy the following relation:

$$V\gamma \div V\omega.$$

Figure 13:
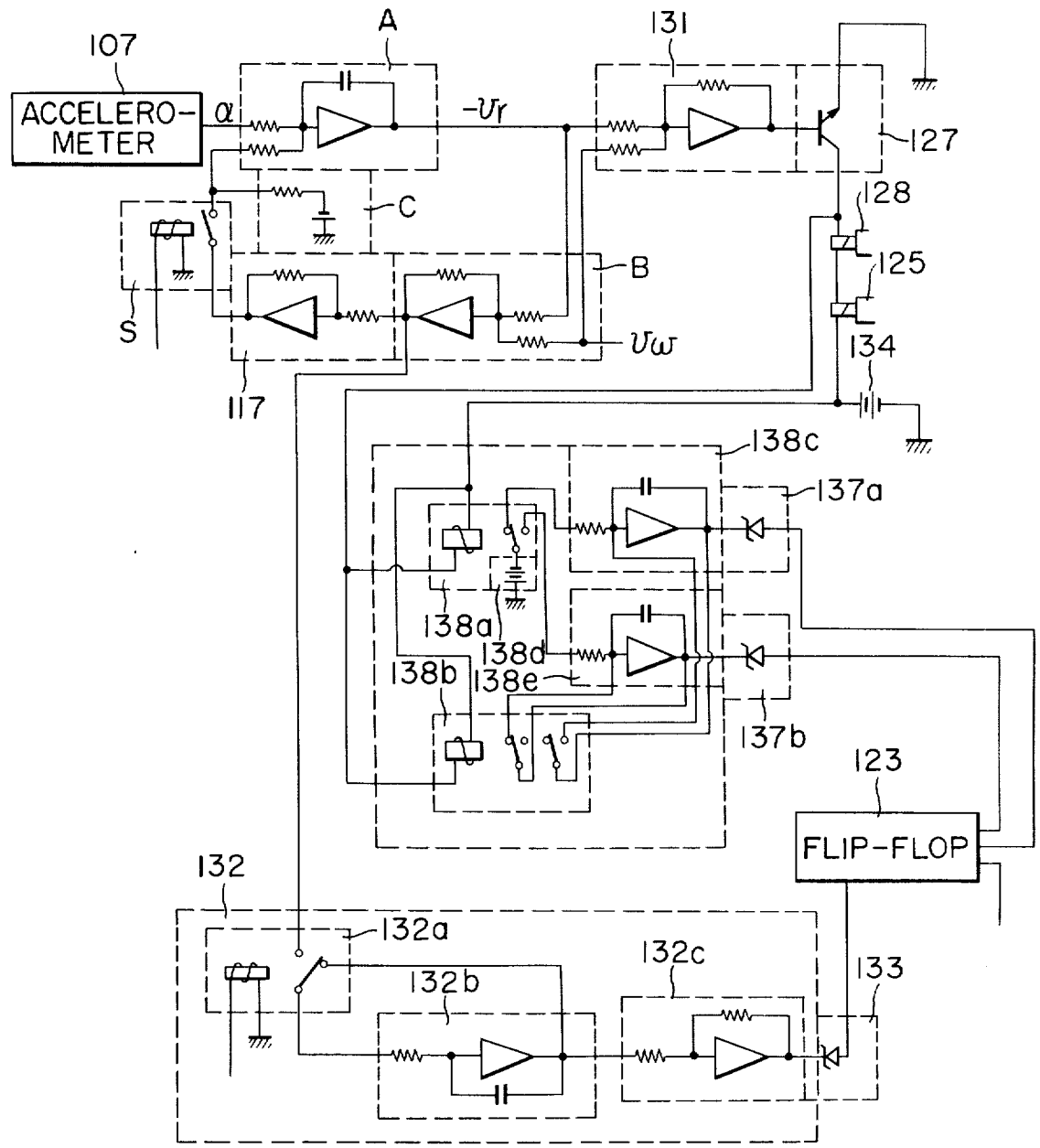
FIG. 13 is a circuit diagram of an electronic circuit of the embodiment shown in FIGS. 12A–12B.

FIG. 13 shows an example of an electronic circuit of the embodiment shown in FIGS. 12A-12B, and the reference numerals in FIG. 3 and the same as those in FIGS. 12A-12B and are used to designate similar parts. The relay switch 132a is actuated in response to the output signal of the NOR circuit 114. That is, when the output of the NOR circuit 114 is 1 so that the coil is energized, the output of the differential amplifier 120 is applied to the integrator 132b so that the output $(V\gamma - V\omega)$ is integrated. The output of the integrator 132b is transmitted through the signal converter 132c to the trigger pulse generator 133. When the output of the NOR circuit 114 is reversed to 0, the relay 132a is so actuated as to feed back the output of the integrator 132b to the input thereof so that the output thereof may be rapidly converged to 0. The timing when the integrator 132b integrates the output of the differential amplifier 120 coincides with the timing when the switch S opens the feedback circuit. Reference numerals 138a and 138b designate relay switches. When the switching device 127 is closed, the input of the integrator 138c is connected to the power source 138d so that the integration is started therein. The time when the switching device 127 is closed is in proportion to the output of the integrator 138c, and when the output of integrator 138c is in excess of a predetermined level, the trigger pulse generator 137a gives the triggering signal to the flip-flop 123 so that its output is reversed from 0 to 1. Since the output of the integrator 138c is grounded, it remains 0 until the relay switches 138a and 138b are actuated again. When the switching device 127 is opened, the relays 138a and 138b are reversed and the functions of the integrators 138c and 138e are reversed. That is, when the output of the integrator 138e becomes in excess of the predetermined level, the trigger pulse generator 137b gives the triggering signal to the flip-flop 123 so that its output is reversed from 0 to 1. FIG. 14 illustrates the output signals of the elements of the tenth embodiment according to the present invention. In FIG. 14 the abscissa shows time $t$.

FIG. 14-1 is a graph illustrating the application of the brake pedal; FIG. 14-2, a graph showing the acceleration signal $\alpha$; FIG. 14-3, a graph showing the velocity signal $V\gamma$ obtained by integrating the accelerating signal; FIG. 14-4, a graph illustrating the wheel speed signal $V\omega$; FIG. 14-5, a graph illustrating the actuation of the switching device 127; FIG. 14-6, a graph illustrating the actuation of the switching device 116; FIG. 14-7, a graph illustrating the actuation or the difference signal of the comparator 132; and FIG. 14-8, a graph illustrating the signal derived from the timer 138.

Figure 15A:
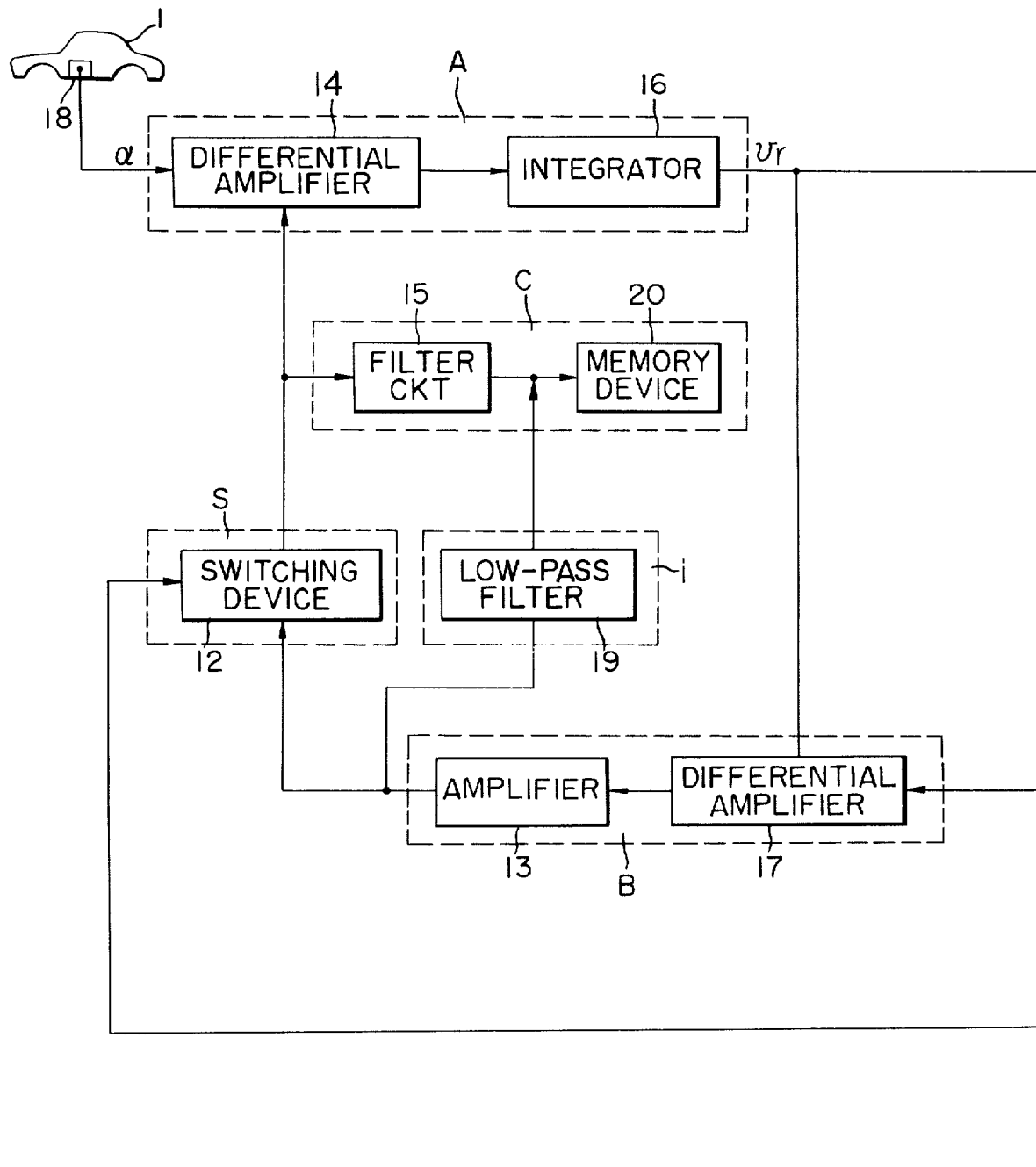
FIGS. 15A–15B are a block diagrams of a variation of the embodiment shown in FIGS. 6A–6B.
Figure 15B:
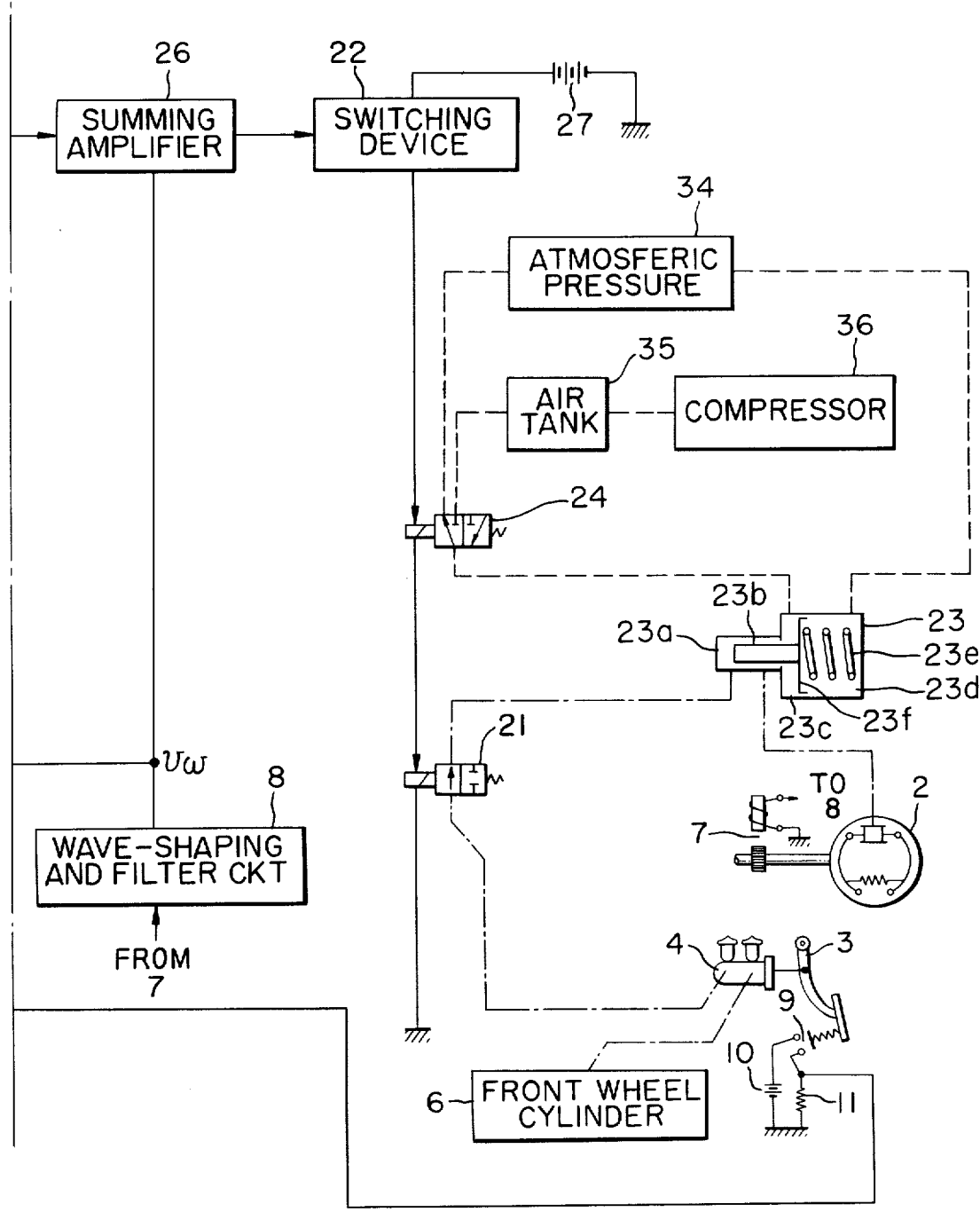
Figure 16:
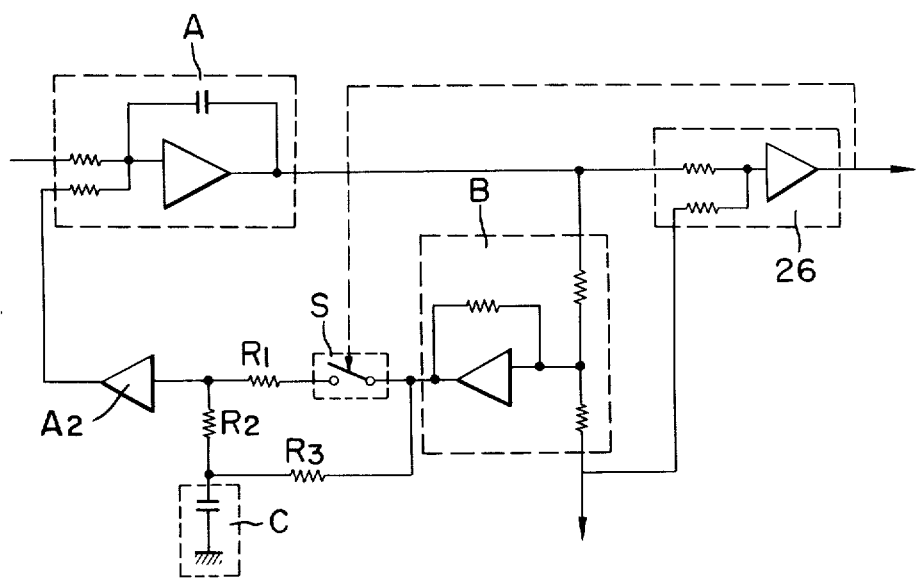
FIG. 16 is a circuit diagram of a variation of the embodiment shown in FIGS. 6A–6B.

When the brake pedal is applied at time $t_o$, the output of the flip-flop 123 is reversed to 1 whereas the output of the NOT circuit 113 becomes zero. In response to the output signals with the periodic time of $(T_1 + T_2)$ seconds from the oscillator 124, the NOR circuit alternately gives the 0 and 1 signals so that the switch 116 is opened and closed as shown in FIG. 14-6. When the switch 116 is opened, the comparator 132 integrates the signal $(V\gamma - V\omega)$. From time $t_o$ to $t_1$ the brake pedal is applied gently that the rear wheels will not skid or slip. As result, the difference signal $(V\gamma - V\omega)$ is not so large and hence its integrated value is less than a trigger level. From a time shortly before the time $t_1$, the brake pedal is applied hard so that the slip or skidding of the rear wheel is gradually increased. The output of the comparator 132 reaches the triggering level so that the output of the flip-flop 123 is reversed from 0 to 1 so that the switch 116 may remain opened as shown in FIG. 14-16. When skidding or slipping is further increased so that the output of the differential amplifier 131 changes from negative to positive at time $t_2$, the switching device 127 is closed so that the hydraulic pressure in the wheel cylinder 105 is decreased. Therefore, the rear wheel is relieved from slipping and when the output of the differential amplifier 131 changes from positive to negative at time $t_3$, the switching device 127 is opened again so that normal braking action is effected. At time $t_4$, skidding or slip occurs again so that the operation for decreasing the hydraulic pressure in the rear wheel cylinder is started again in the manner described hereinbefore. Until time $t_5$, the above operation is cycled. The timer 138 measures the time interval when the switching device 127 remains opened or closed, but since the time interval is too short, the output signal of the timer 138 will not reach a trigger level. When the braking force applied to the brake pedal is released at time $t_5$, the rear wheel is relieved from skidding or slipping so that the signal for decreasing the hydraulic pressure 105 will not be generated. As a result, the switching device 127 remains opened, and at time $t_6$ the output of the timer 138 reaches a trigger level. The output of the flip-flop 123 is reversed from 0 to 1 so that the on-off operation of the switch 116 is started again. Thus, the vehicle velocity $V\gamma$ is so controlled as to approach the wheel speed $V\omega$.

In summary, when the brake pedal is not applied, the vehicle velocity $V\gamma$ is controlled as to approach or become equal to the wheel velocity $V\omega$. The noise included in the acceleration signal is compensated by means of such control thereof. When the brake pedal is applied in such a manner that the wheel will not slip or skid, the difference signal (V$\gamma$ − V$\omega$) is intermittently amplified and fed back so that the vehicle velocity V$\gamma$ is controlled to satisfy the following relation:

$$V\gamma \div V\omega$$

and the correction of the signal stored in the memory device is also effected in order to improve the reliability of the automatic control system. When the brake pedal is applied so hard that the wheels start to skid or slip, the vehicle velocity V$\gamma$ is obtained by integrating the acceleration of the vehicle as in the case of the conventional slip-ratio control system, but it should be noted that the rapid braking when the hydraulic pressure in the rear wheel cylinder is alternately increased and decreased lasts for a few second and ten seconds at the most and the noise in the acceleration signal is almost completely compensated by the signal stored in the memory device so that the vehicle velocity V$\gamma$ may be obtained with an extremely higher degree of accuracy. Furthermore, when the force applied to the brake pedal is decreased or when a time interval when the hydraulic pressure in the wheel cylinder is decreased lasts in excess of the predetermined time interval due to the erratic operation of the automatic control system, the compensation circuit for resetting the vehicle velocity V$\gamma$ so as to satisfy the relation of $$V\gamma = V\omega$$

is actuated in the manner described hereinbefore.

VARIATION OF SIXTH EMBODIMENT, FIGS. 15 AND 16

The actuator used in the variation shown in FIG. 15 is different from that of the sixth embodiment shown in FIGS. 6A–6B. When the switching device 22 is opened, the left chamber 23c and the right chamber 23d are communicated with the atmospheric pressure 34 through the three-way valve 24 and the diaphragm 23f made integral with a hydraulic piston 23b which is biased to the left under the force of the spring 23e. But when the switching device 22 is closed, the three-way valve 24 is so actuated as to communicate the left chamber 23c with the air tank 35 connecting with the compressor 36 so that the diaphragm 23f is caused to move to right against the spring 23e. As a result, the hydraulic pressure in the hydraulic cylinder 23a is decreased as in the case of the sixth embodiment. The actuator system described above may be used not only in the sixth embodiment but also in other embodiments described hereinbefore. Furthermore, the hydraulic actuator may be used instead of the pneumatic actuator 23 or 126, and the tachometer 7 or 108 may be of the generator type. The actuator or the brake booster may be controlled by means of an analog or digital manner instead of the ON-OFF controlling method thereof. Instead of integrating the difference between the signals V$\gamma$ and V$\omega$, the difference signal per se may be used in the comparator 132.

In the first embodiment shown in FIG. 1, the input of the filter circuit $i$ is connected to the first adder-amplifier B and the switching device S whereas the output thereof is connected to one of the input terminals of the integrator A, thereby making up an auxiliary feedback circuit. However, as shown in FIGS. 6A-6B and 7, the input terminal of the filter $i$ may be connected to the contact between the first adder-amplifier B and the switching circuit S whereas the output terminal thereof is connected to to the contact between the feedback circuit and the memory device C, thereby providing an auxiliary feedback circuit. Moreover, as shown in FIG. 16 a RC filter circuit may be inserted between the switching device S and the integrator A, thereby forming an auxiliary feedback circuit integral with a main feedback circuit comprising of the first adder-amplifier B and the switching circuit S.

Next, the variation shown in FIG. 16 will be described in more detail hereinafter. A first resistor $R_1$ and an amplifier $A_2$ with a high input impedance are inserted between the switching means S and the integrator means A, and in order to prevent the oscillation in the feedback circuit or loop, a second resistor $R_2$ is inserted between the memory device C and the feedback circuit so that the first and second resistor $R_1$ and $R_2$ and the capacitor in the memory circuit C may make up a RC filter circuit. The time constant of the RC filter circuit is selected to be large. In this variation, the switching device S is not actuated in response to the application of the brake pedal, but is closed only in response to the output of the second adder-amplifier 26. The first adder-amplifier B has an amplification degree $K = 200$ and the high input impedance amplifier $A_2$ has an amplification degree $K = 1$ and has an input impedance substantially higher than those of the first and second resistors $R_1$ and $R_2$.

When the automotive vehicle is travelling without the brake pedal being applied or when the brake pedal is so applied that the wheels will not skid or slip, the feedback system will not respond to the fast change of the wheel speed, but will respond quickly to the DC offset voltage caused by the instantaneous change in drift and noise of the accelerometer and in noise and to the influences caused when the automotive vehicle travels on the upgrade or downgrade so that the feedback control thereof can be attained. Furthermore, when the brake pedal is applied gently, the signal stored in the memory device C is corrected, and in the memory device is stored the signal representing the effect caused by the drift noise or gravity immediately before skidding or slip is started. However, the feedback system cannot respond to the abrupt change in wheel speed V$\omega$ caused when the wheels skid or slip. When the wheel speed V$\omega$ changes abruptly, the output in response to the change thereof appears at the output terminal of the first adder-amplifier B, but it is not immediately applied to the high input impedance amplifier $A_2$ because of the RC filter circuit with a time constant of $(R_1 + R_2)C$. Therefore, the output of the first summing amplifier B is not immediately fed back to the integrator A so that the vehicle velocity V$\gamma$ is obtained by the integration of the difference between the feedback signal and the acceleration signal from the accelerometer.

Therefore when the brake pedal is applied abruptly and hard the braking action may be satisfactorily controlled in response to the vehicle velocity V$\gamma$ which in turn is computed with a higher degree of accuracy based upon the signal stored in the memory device immediately before skidding or slip is started. Thus, the skid of the vehicle may be prevented and the stopping distance thereof may be reduced in a safe and efficient manner.

Since the input impedance of the amplifier $A_2$ is high, the signal to be stored in the memory device, that is the voltage to be applied to the capacitor, may be applied to the junction between the first and second resistors $R_1$ and $R_2$ or to the contact between the memory device C and the second resistor $R_2$. When the signal is applied to the contact between the first and second resistors, the signal stored in the memory device remains unchanged, but the oscillation due to the dynamic change in signal to be stored may be prevented.

In the variation shown in FIG. 16, the actuation of the switching device S is controlled in response to the output of the second adder-amplifier 26 that is, the switching means S is actuated when the output thereof is in excess of the predetermined slip ratio, but it should be noted that when the feedback circuit is made up as shown in this variation (FIG. 16), the braking action can be satisfactorily controlled without the control of the actuation of the first switching means S eliminates the control of the actuation of the switching device S and that the braking action can be even when the switching device S is normally closed.

As shown in FIG. 16, a third resistor $R_3$ is inserted between the contact of the first summing-amplifier B and the switching device S and the contact between the second resistor $R_2$ and the memory means C. Therefore even after the switching device S is opened, the feedback control is effected in such a way that the vehicle velocity $V\gamma$ approaches gradually the wheel speed $V\omega$. The reason is that when the switching device is closed, the third resistor $R_3$ is connected in parallel with the first and second resistors $R_1 + R_2$ so that the time constant of the first switching means S is shorter than that when the switching device S is opened. As a result, the response of the feedback system becomes faster, and even when the switching device S is opened, the feedback circuit is established. When skidding or slipping continues for a considerably long time so that the switching device S remains opened in proportion, the vehicle velocity $V\gamma$ is smaller than the true velocity so that the safe operation of the automatic control system may be ensured.

As described above, according to the present invention, the satisfactory compensation of the error of the vehicle velocity caused by noise or the like may be made when the brake pedal is applied so that accurate braking action may be ensured.

Thus far, the automatic control system of the present invention has been described as being applied to the rear wheel brake system, but it will be understood that it may be also to the applied not only to the rear wheels but also front wheel brake systems. As described hereinbefore, either the pneumatic or hydraulic actuator may be employed.

Furthermore, the response of the automatic control system in accordance with the present invention may be made faster by inserting a differentiator or phase advancer 41 between the wave-shaping circuit 8 or DA converter 109 and the summing-amplifier 26 or 131.

What is claimed is:

1. A method for automatically controlling the application of braking forces to wheels of a moving vehicle through a brake, comprising the steps of:
    detecting an acceleration of a moving vehicle,
    detecting a wheel speed of said moving vehicle,
    computing a vehicle velocity by integrating said detected acceleration with an integrator means,
    comparing said computed vehicle velocity and said detected wheel velocity,
    generating an electrical signal indicating the difference between said vehicle velocity and said wheel velocity,
    feeding back said electrical signal indicating the difference between said vehicle velocity and said wheel velocity to said integrator means and to a memory means through a first switching means thereby maintaining said vehicle velocity equal to said difference and storing said wheel velocity signal whenever the brake is not applied,
    opening said first switching means in response to application of the brake, and feeding back said difference signal which is stored in said memory means immediately before the application of the brake to the integrator means thereby cancelling the drafts, noises, and effects of gravitational acceleration normally encountered during the acceleration detecting step when said moving vehicle is travelling on an inclined road,
    auxiliarily feeding back said electrical difference signal to said integrator when the brake is gently applied for a long time, thereby compensating the error introduced in the mathematical operation of integration,
    computing whether a slip ratio of said wheel velocity to said vehicle velocity is larger than a predetermined value,
    decreasing the braking force to a reduced operating level in response to a slip ratio larger than said predetermined value, and resetting the braking force to a normal operation level in response to a slip ratio smaller than said predetermined value.

2. An automatic brake controlling method according to claim 1, wherein said step of auxiliarily feeding back said electrical difference signal comprises the step of
    feeding back a low frequency component of said electrical signal indicating the difference between said vehicle velocity and said wheel velocity to said integrator means, thereby compensating the error introduced in the methematical operation of integration when the brake is gently applied for a long time.

3. A device for automatically controlling the application of braking forces to the wheels of a moving vehicle through a brake device, comprising
    acceleration detecting means for detecting an acceleration of a moving vehicle,
    wheel velocity detecting means for detecting a wheel speed of said moving vehicle,
    means for integrating said detected acceleration, means for comparing said computed vehicle velocity and said detected wheel velocity and for generating an electrical signal indicating the difference between said vehicle velocity and said wheel velocity, memory means for storing electrical signals connected to said integrating means, means for feeding back said difference signal to said integrating means and to said memory means, comprising a first switching means for connecting the electrical difference signal to the integrating means and to the memory means in response to the absence of application of brake pressure and for disconnecting the connection between the comparing means and the integrating means in response to the application of the brake,
    said memory means thereby storing said difference signal between said vehicle velocity and said wheel velocity fed back immediately before the application of the brake, and applying said stored difference signal to the integrating means during the application of the brake, thereby cancelling the drifts, noises and the effects of gravitational acceleration on said acceleration detecting means when said moving vehicle is travelling on an inclined road, auxiliary feedback means for applying an electrical signal in response to the difference between said vehicle velocity and said wheel velocity on the sustained gentle application of the brake thereby compensating the error introduced in the mathematical operation of integration by said integrating means when the brake is gently applied for a long time, computing means for determining whether a slip ratio of said wheel velocity to said vehicle velocity is larger than a predetermined value, and controlling means for reducing the brake force in response to a slip ratio larger than said predetermined value, and for reapplying the braking force at a normal operating level in response to a slip ratio smaller than said predetermined value.

4. An automatic brake controlling device according to claim 3, wherein said auxiliary feedback means comprises means for applying a low frequency component of said electrical difference signal to said integrating means, thereby compensating the operational error of said integrating means when the brake is gently applied for a long time.

5. An automatic brake controlling device according to claim 4, wherein said first switching means comprises a first switching device connected in series with the output of said first summing amplifier and with the input of said integrator, and means for controlling said first switching device of said first switching means connected to the output side of said second adder-amplifier, thereby opening said first switching device in response to the output of said second adder-amplifier, wherein said feedback means further comprises a filter circuit connecting said first switching device to the filter of said memory means, and a signal converter connecting said filter of said memory means and said filter circuit to said differential amplifier of said integrating means.

6. An automatic brake controlling device according to claim 3, wherein said comparing means comprises a first summing amplifier, and said first switching means comprises a first switching device.

7. An automatic brake controlling device for a brake according to claim 6, wherein said auxiliary feedback means comprises a filter circuit connecting the output of said first summing amplifier to the input of said integrating means.

8. An automatic brake controlling device according to claim 3, wherein said acceleration detecting means comprises means for detecting an acceleration of a moving vehicle and for converting the detected acceleration into an electrical signal, and wherein said wheel velocity detecting means comprises means for detecting the rotational speed of a wheel in the form of an electrical signal, said integrating means being electrically connected to the output of said acceleration detecting means, for integrating said electrical acceleration signals, thereby computing the velocity of said moving vehicle, wherein said comparing means comprises a first summing-amplifier for comparing the signal representing the vehicle velocity and the signal representing the wheel speed and for amplifying the difference signal therebetween, said first switching means comprising a first switching device connected in series with the output of said first summing-amplifier and with the input of said integrator, and means for controlling said first switching device in response to the detection of the braking forces exerted to the wheels, said memory means being connected to the output of said first switching means, wherein said computing means comprises a second summing-amplifier for comparing and amplifying the output signal of said integrator representing said vehicle velocity and the signal representing said wheel speed, a second switching means operating in response to an output condition of said second summing amplifier for operating said controlling means, said controlling means modifying the braking forces applied to the wheels when a brake pedal is abruptly applied and the difference signal becomes so large that the predetermined output condition at the second summing-amplifier is produced and said second switching means is closed, and wherein said auxiliary feedback means comprises an auxiliary feedback circuit interconnected between the output of said first summing-amplifier and the input of said integrating means for feeding back to said integrator means a portion of the signal obtained from said vehicle velocity signal and said wheel speed signal, thereby compensating the error introduced in the mathematical operation of integration by said integration means when the brake is gently applied for a long time, whereby the braking forces are decreased or increased depending upon whether a slip ratio which is obtained from said vehicle velocity and said wheel velocity, is larger or smaller than a predetermined ratio.

9. An automatic brake controlling device according to claim 8, wherein said acceleration detecting means is an accelerometer, wherein said wheel velocity detecting means for detecting the wheel speed and generating an electrical signal representing said detected wheel speed comprises a tachometer, a filter circuit and a waveshaping circuit, wherein said integrating means comprises a first differential amplifier connected to said accelerometer and an integrator connected to said first differential amplifier, wherein said first summing-amplifier comprises a differential amplifier connected to said integrator of said integrating means, said wave shaping and filter circuit of said wheel velocity detecting means, and an amplifier connected to said differential amplifier, wherein said first switching means comprises a first switching device connected in series with said amplifier of said first summing amplifier and said differential amplifier of said integrating means, and means for controlling said first switching device in response to the detection of the braking forces exerted on the wheels, wherein said memory means comprises a filter circuit connected to the output of said first switching device and a memory device connected to said filter circuit, wherein said computing means comprises a second summing amplifier connected to said wave-shaping circuit of said wheel velocity detecting means and to said integrator for comparing and amplifying the output signal of said integrator representing said vehicle velocity and the signal representing said wheel speed, and a second switching means connected to said second summing amplifier and operated thereby in response to an output of said second summing amplifier rising above and falling below a predetermined level for activating and deactivating said controlling means.

10. An automatic brake controlling device for a brake according to claim 9, wherein said means for controlling said first switching device of said first switching means comprises a D-C power source; a limit switch operated by the brake pedal; and a first relay comprising coils, an armature connected to a contact member of said first switching means, and a spring for biasing said armature, said D-C source, limit switch and first relay being connected electrically in series, wherein said controlling means for controlling the braking force produced by the brake comprises a brake booster provided with two chambers for activation of said brake in response to an imbalance in hydraulic pressure between said two chambers, a source of negative pressure connected to one chamber of the brake booster, a first hydraulic actuator provided with a first passage connected respectively to the other chamber of the brake booster, the negative pressure source, and atmospheric pressure, and provided with a valve in said first passage for selectively connecting said other chamber to negative pressure and to atmospheric pressure, a second relay comprising a D-C power source, a solenoid connected to said second switching means and to the D-C power source, an armature connected to said vlave interposed within said first passage, and a spring for biasing said armature of said second relay, a second hydraulic actuator provided with a second passage connected to one chamber of said brake booster and a master cylinder of the brake, and being provided with a valve, a second relay comprising a solenoid connected to said second switching means and said D-C power source, an armature connected to said valve interposed within said second passage, and a spring for biasing said armature; and wherein said auxiliary feedback means comprises a filter circuit comprising low-pass filter connected to the output of said first summing amplifier chambers to said filter circuit and said memory device of said memory circuit.

11. An automatic brake controlling device according to claim 10, further comprising a signal converter connecting said differential amplifier of said integrator means and said filter circuit of said memory means.

12. An automatic brake controlling device according to claim 9, wherein said controlling means for controlling the braking force produced by the brake comprises a brake booster provided with two chambers for actuation of said brake in response to an imbalance in hydraulic pressure between said two chambers, a compressed air tank, a compressor, a source of atmospheric pressure connected to one chamber of the brake booster, a first hydraulic actuator provided with a first passage connected respectively to the other chamber of the brake booster, to said air tank and said compressor and to said source of atmospheric pressure, said booster being provided with a valve in said first passage for selectively connecting said other chamber to the air tank and to the source of atmospheric pressure, a first relay comprising a DC power source, a solenoid connected to said second switching means and to said DC power source, an armature connected to said valve interposed within said first passage, and a spring for biasing said armature, a second hydraulic actuator provided with a second passage connected to one chamber of said brake booster and to a master cylinder of the brake and being provided with a valve in said second passage, a second relay comprising a solenoid connected to said second switching means and said DC power source, an armature connected to said valve interposed within said second passage, and a spring for biasing said armature.

* * * * *

UNITED STATES PATENT OFFICE
CERTIFICATE OF CORRECTION

Patent No. 3,904,251    Dated September 9, 1975

Inventor(s) Ryotaro Hikida, et al

It is certified that error appears in the above-identified patent and that said Letters Patent are hereby corrected as shown below:

Column 2, line 47: Change "reudced" to --reduced--.

Column 5, line 4: Change "$V\delta$" to --$V_\gamma$--.

Column 7, lines 61 and 66: Change " $\div$ " to -- $\doteq$ --.

Column 9, line 50: Change " $\div$ " to -- $\doteq$ --.

Column 10, lines 31, 41 and 64: Change " $\div$ " to -- $\doteq$ --.

Column 11, line 56: Change " $\div$ " to -- $\doteq$ --.

Column 12, line 29: Delete "from".

Column 13, line 37: Delete "and".

line 62: Change " $\div$ " to -- $\doteq$ --.

Column 15, line 34: Change " $\div$ " to -- $\doteq$ --.

line 37: Change "and" to --are--.

Column 17, line 7: Change " $\div$ " to -- $\doteq$ --.

Column 19, line 18: Cancel "and that the braking action can be"

UNITED STATES PATENT OFFICE
CERTIFICATE OF CORRECTION

Patent No. 3,904,251          Dated September 9, 1975

Inventor(s) Ryotaro Hikida, et al

It is certified that error appears in the above-identified patent and that said Letters Patent are hereby corrected as shown below:

Column 23, line 48: Change "vlave" to --valve--.

Column 24, line 20: Change "9" to --10--.

Signed and Sealed this thirtieth Day of March 1976

[SEAL]

Attest:

RUTH C. MASON
*Attesting Officer*

C. MARSHALL DANN
*Commissioner of Patents and Trademarks*

UNITED STATES PATENT OFFICE
CERTIFICATE OF CORRECTION

Patent No. 3,904,251  Dated September 9, 1975

Inventor(s) Ryotaro Hikida, et al

It is certified that error appears in the above-identified patent and that said Letters Patent are hereby corrected as shown below:

Column 20, lines 9-10: Change "said difference and storing said wheel velocity signal" to --said wheel velocity and storing said difference signal--.

Signed and Sealed this

Second Day of November 1976

[SEAL]

Attest:

RUTH C. MASON
Attesting Officer

C. MARSHALL DANN
Commissioner of Patents and Trademarks